(12) United States Patent
Kitagawa

(10) Patent No.: US 6,520,577 B2
(45) Date of Patent: Feb. 18, 2003

(54) VEHICLE SEAT

(75) Inventor: Yuichi Kitagawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/883,355

(22) Filed: Jun. 19, 2001

(65) Prior Publication Data

US 2002/0030392 A1 Mar. 14, 2002

(30) Foreign Application Priority Data

Jun. 21, 2000 (JP) ........................................ 2000-186897

(51) Int. Cl.[7] ................................................ B60N 2/42
(52) U.S. Cl. .............................. 297/216.13; 297/216.14
(58) Field of Search ........................ 297/216.13, 216.14, 297/216.15, 216.16, 216.1, 452.52, 452.53

(56) References Cited

U.S. PATENT DOCUMENTS

| | | | | |
|---|---|---|---|---|
| 5,490,706 A | * | 2/1996 | Totani | 296/68.1 |
| 5,676,421 A | * | 10/1997 | Brodsky | 297/216.13 |
| 5,746,467 A | * | 5/1998 | Jesadanont | 296/68.1 |
| 6,109,692 A | * | 8/2000 | Håland et al. | 297/216.13 |
| 6,375,262 B1 | * | 4/2002 | Watanabe | 297/216.12 |

FOREIGN PATENT DOCUMENTS

JP          7-291005 A      11/1995

* cited by examiner

Primary Examiner—Peter M. Cuomo
Assistant Examiner—Erika Garrett
(74) Attorney, Agent, or Firm—Shinjyu Global IP Counselors, LLP

(57) ABSTRACT

When a load is generated in an area of seatback that supports the pelvis of the occupant at the time of vehicle collision, a trigger mechanism located at a lower support member is activated. At this time, a displacement mechanism of an upper support member becomes available for activation. Since the upper support member moves in a rearward direction, the load applied to the thoracic vertebrae of the occupant can be kept small. Accordingly, the spinal shape of the occupant can be maintained. Additionally, the vehicle seat can mitigate the impact at the time of vehicle collision.

18 Claims, 21 Drawing Sheets

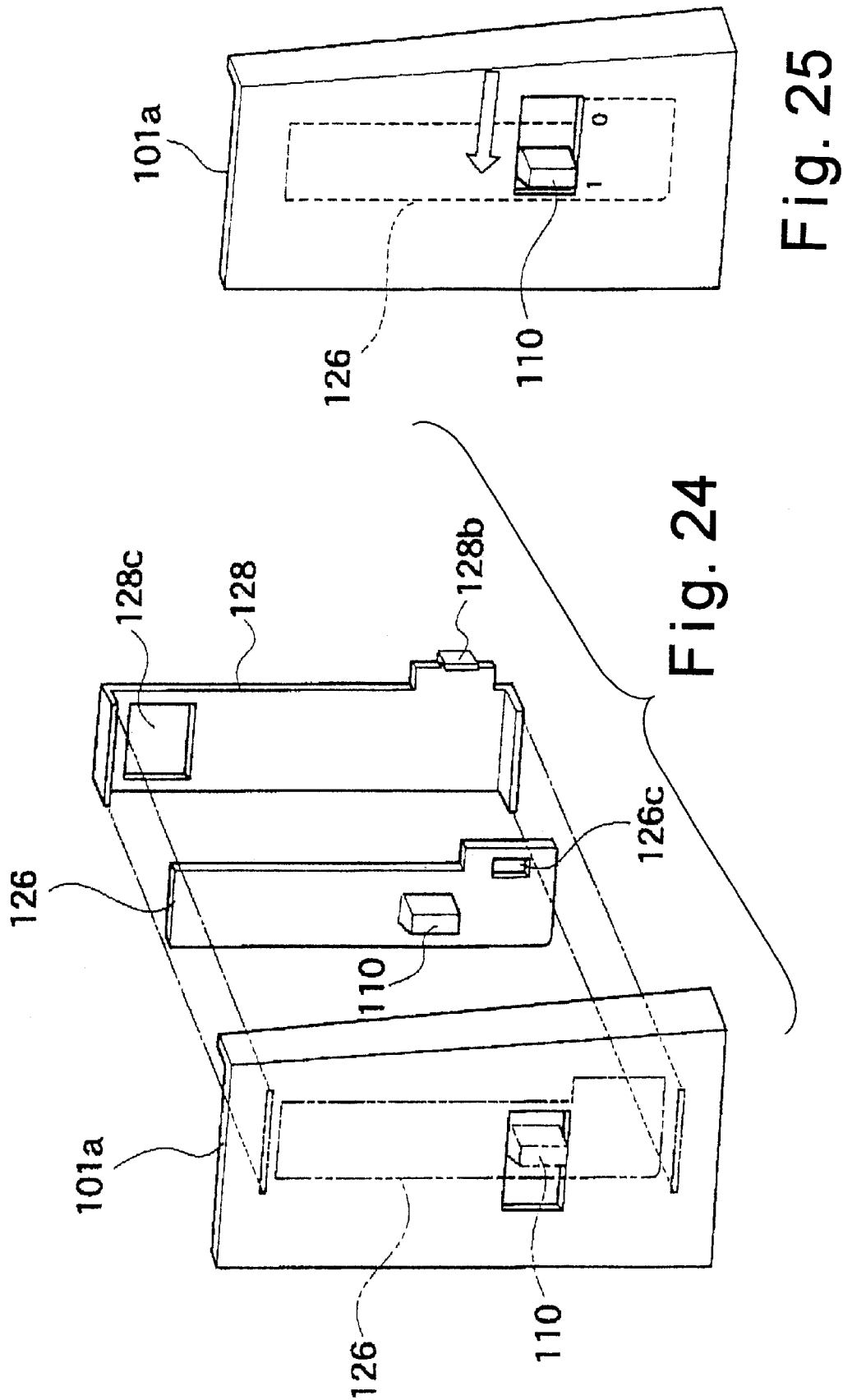

VEHICLE SEAT

BACKGROUND OF THE INVENTION

1. Field of the Invention

The present invention generally relates to a vehicle seat. More specifically, the present invention relates to a seatback for a vehicle seat, which can mitigate an impact to an occupant at the time of a collision from rear.

2. Background Information

Japanese Laid-Open Patent Application H7-291005 shows a connection member is provided in a connecting portion that connects a seatback frame and a plurality of cushion members. The seatback frame supports a headrest. The cushion members are S springs that are installed in a seatback. The connecting members move in a rearward direction when a load greater than a predetermined amount is applied to the connecting members. When the occupant is pushed against the cushion members as a reaction to the impact of the collision of the vehicle, and accordingly the load applied to the cushion members reaches a predetermined value, the connecting members that are on both sides of the cushion member being pushed extend in the rearward direction. In this manner, the posture of the occupant is maintained, while making the headrest receive the head of the occupant securely.

However, the shape of seatback and the distribution of the rigidity of seatback generally need to be determined taking into consideration ease of driving operation, comfort to the occupant, and ability to mitigate fatigue. Particularly, in order to allow the occupant to maintain a proper sitting posture effectively, the seatback structure has to support the lumbar vertebrae. Thus, this type of seatback is designed to form a high rigidity part in the lumbar support area.

At the time of collision of the vehicle, the occupant moves in the rearward direction relative to the vehicle body and the seat due to the inertial force. In the above structure, the connecting portion between the cushion members such as S springs and the seat frame moves in the rearward direction upon receiving a uniform predetermined load. In such structure, when a great load is applied to the lumbar support area, the S spring behind the lumbar support area moves rearward, while other S springs do not move. As a result, the S springs behind the thoracic vertebrae, for instance, do not move rearward until the load in the thoracic support area becomes great enough.

Furthermore, if the occupant sits on the seat with much speed during a normal operation, a false activation may occur. In order to prevent such false activation, the load at which the connecting portion starts moving rearward has to be set high. Accordingly, it is difficult to configure the structure in a manner that allows activation of the connecting portion easily at the time of a collision of vehicles.

In view of the above, there exists a need for a seatback for a vehicle which overcomes the above mentioned problems in the prior art. Specifically, there exists a need for a vehicle seatback that can mitigate impact to the occupant at the time of collision without causing an inconvenience during the normal operation. This invention addresses this need in the prior art as well as other needs, which will become apparent to those skilled in the art from this disclosure.

SUMMARY OF THE INVENTION

It is an object of the present invention to provide a seatback for a vehicle that can mitigate impact to the occupant at the time of collision without causing an inconvenience during the normal operation.

The aforementioned object can be attained by providing a vehicle seat comprising a seat bottom, a seatback, at least two elastic supporting members, a displacement mechanism and a trigger mechanism. The seat bottom supports a buttock of an occupant. The seatback supports an upper body of the occupant. The elastic supporting members is disposed in a transverse direction within the seatback. The elastic supporting members includes a lower support member disposed to support a pelvis of the occupant and an upper support member disposed to support a back of the occupant. The displacement mechanism is disposed within the seatback and is coupled between the seatback and the upper support member to move the upper support member in a rearward direction relative to the seatback. The trigger mechanism is disposed within the seatback and is operatively coupled to the displacement mechanism at the lower support member to activate the displacement mechanism only upon receiving a rearward load greater than a predetermined value.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 24 is a partial outside, exploded perspective view of the seatback in accordance with the second embodiment of the present invention;

FIG. 25 is a partial outside perspective view of the seatback in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention are provided for illustration only, and not for the purpose of limiting the invention as defined by the appended claims and their equivalents.

First Embodiment

Figure 1:
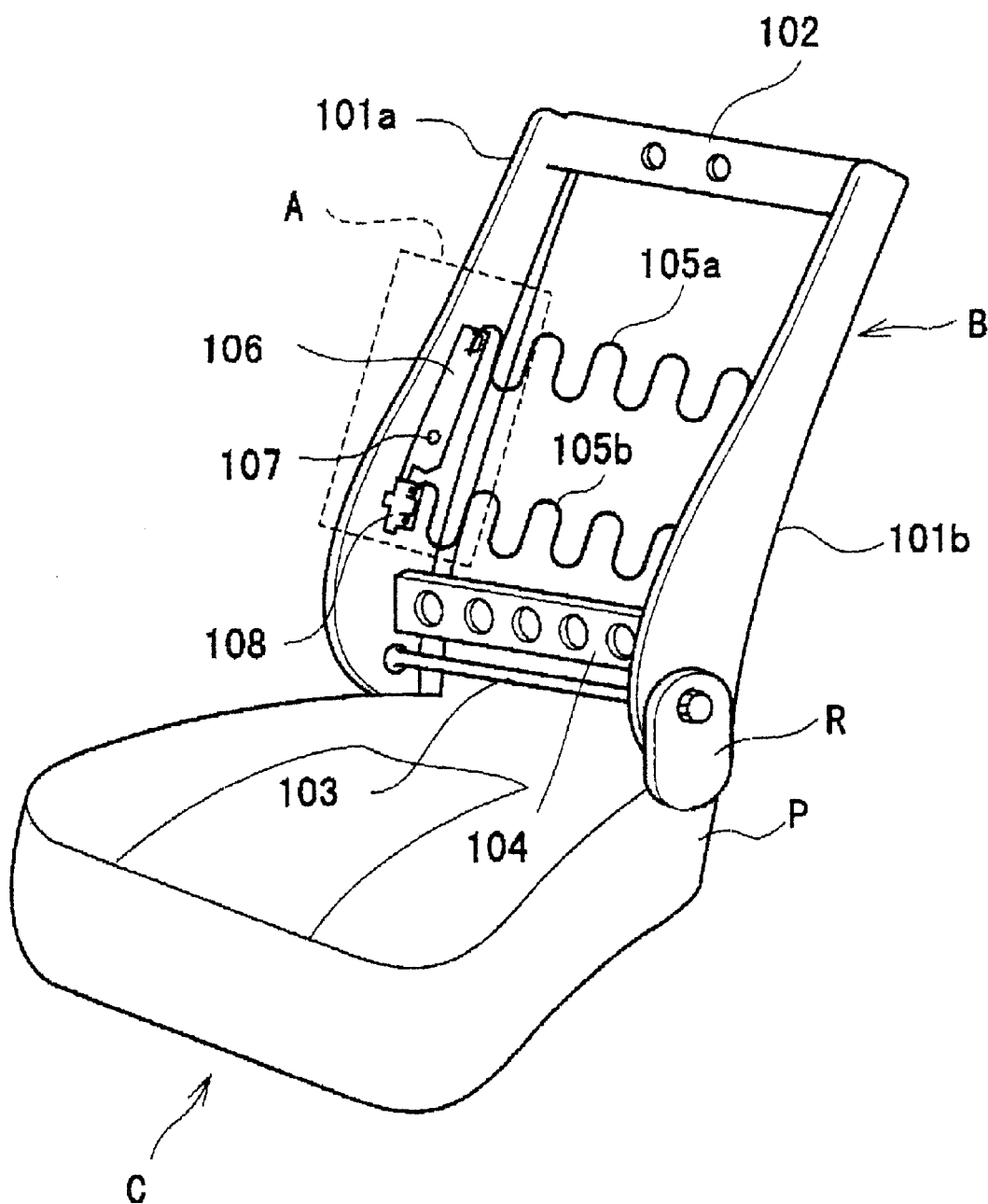
FIG. 1 is a perspective view of an entire structure of a vehicle seat in accordance with a first embodiment of the present invention.

Referring initially to FIGS. 1–13, a vehicle seat is illustrated to explain a first embodiment of the present invention. FIG. 1 shows an entire structure of the seat for a vehicle in accordance with a first embodiment of the present invention. The seat has a seat cushion C that supports a buttock of an occupant and a seatback B that supports an upper body of the occupant.

In FIG. 1, the seatback B is depicted as a seatback frame from which surface and the urethane cushion material have been removed. The seatback frame has a pair of frames 101a and 101b, and an upper cross 102. The frames 101a and 101b are disposed on the left and right sides, extending in the vertical direction so as to conform to the shape of the spine of the occupant. The upper cross 102 connects upper ends of the frames 101a and 101b. The upper cross 102 also provides the rigidity with which a headrest 116 (shown in FIGS. 19 and 21) is supported. At bottom ends of the frames 101a and 101b, a rotational axis 103 is provided to connect the seat cushion C and a seat pan P via a recliner R.

In order to secure the rigidity in the bottom end area, a lower cross 104 can be provided so as to connect the frames 101a and 101b, as seen in FIG. 1.

Since covering the seatback frame with the urethane cushion material and the surface alone will not provide sufficient rigidity to support the upper body of the occupant, a plurality of elastic support members such as S springs is further provided to generate more rigidity. The S springs are disposed in the transverse direction.

In this embodiment, the S springs 105a and 105b are respectively provided on upper and lower portions. The upper S spring 105a forms an upper support member, which supports the thoracic vertebrae of the occupant. The lower S spring 105b forms a lower support member that supports the lumbar vertebrae of the occupant.

Figure 3:
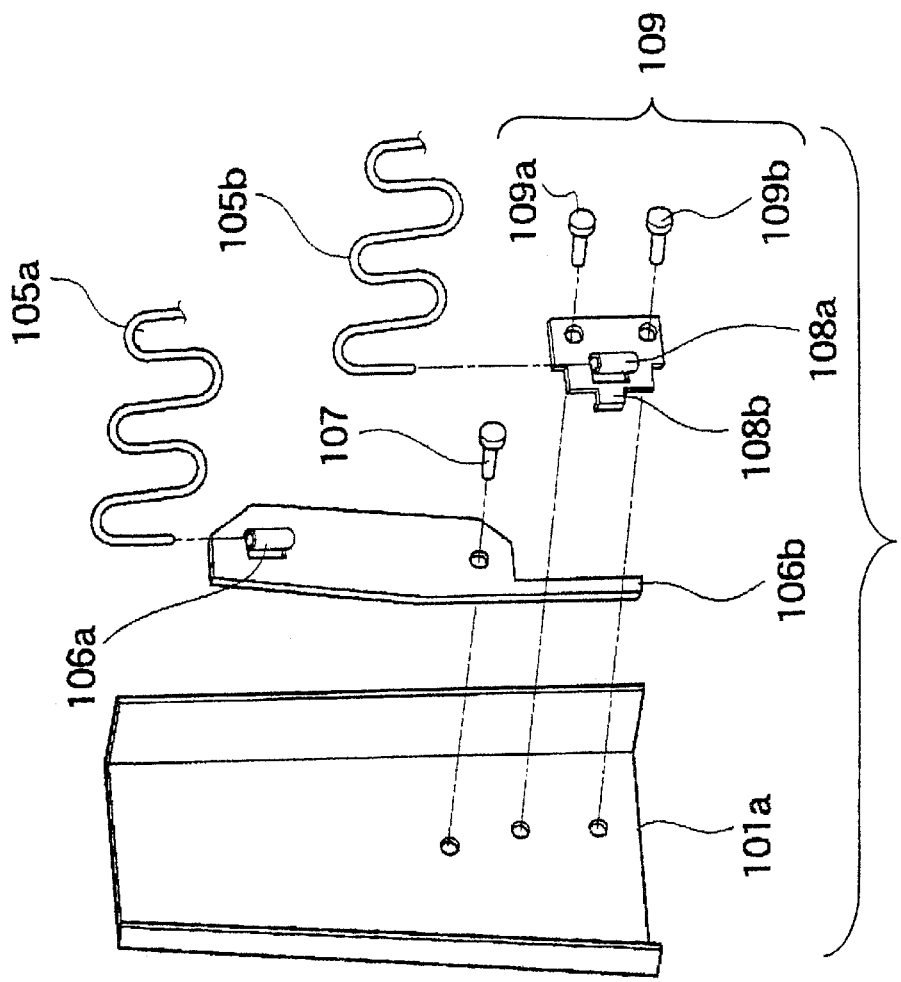
FIG. 3 is a perspective view of the encircled range A of the seatback in FIG. 1, shown in an exploded state.
Figure 2:
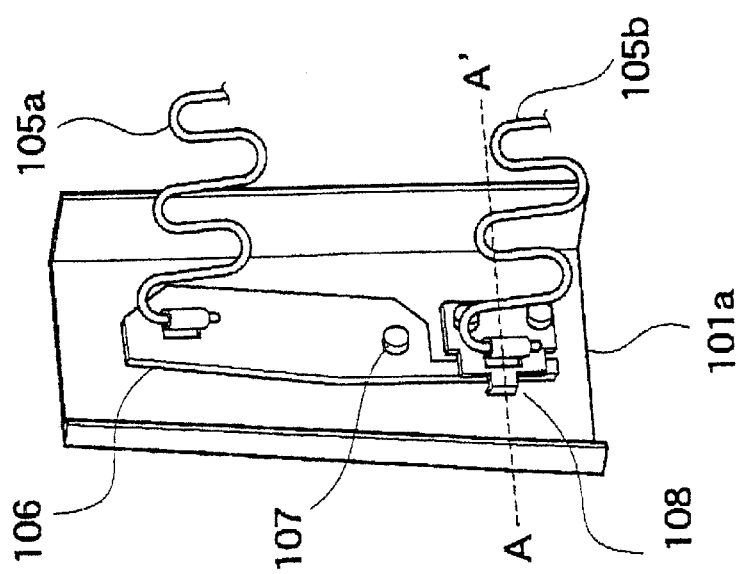
FIG. 2 is a perspective view of the encircled range A of the seatback in FIG. 1, shown in an assembled state.

FIGS. 2 and 3 are assembled and expanded views of a portion of the seat structure encircled by a broken line A in FIG. 1. More specifically, FIGS. 2 and 3 show how the S springs 105a and 105b are attached to the frame 101a.

As described above, the upper S spring 105a is disposed at a height that substantially corresponds to the thoracic vertebrae of the occupant, while the lower S spring 105b is disposed at a height that substantially corresponds to the lumbar vertebrae of the occupant. The rigidity of the upper S spring 105a is set soft in order to provide comfort to the occupant. On the other hand, the rigidity of the lower S spring 105b is set hard in order to support the lumbar vertebrae.

An end of the upper S spring 105a is fixed to a rotational plate 106. Preferably, the end of the upper S spring 105a is coupled to a hook 106a, which is formed by rolling a portion of the rotational plate 106.

The rotational plate 106 is coupled to the frame 101a via a pin 107. The rotational plate 106 can rotate freely about pin 107. The rotational plate 106 has a longitudinally long shape. The hook 106a to which the upper S spring 105a is fixed is positioned above pin 107. An arm 106b extends below pin 107. This freely rotatable mechanism forms a displacement mechanism or displacing means that can move the upper support member in a rearward direction relative to the seatback.

An end of the lower S spring 105b is fixed to a plate spring 108. The plate spring 108 is fixed to the frame 101a via a pair of rivets 109a and 109b. Alternatively, the plate spring 108 can be fixed by a bolt or welding or other means.

An attachment point 109 (the rivets 109a and 109b) is positioned on a rear portion (rear side of the vehicle) of the spring plate 108. The lower S spring 105b is fixed to the spring plate 108 at a point that is on a front portion relative to the aforesaid attachment point 109. For instance, the lower S spring 105b is hooked to a hook 108a that is formed by rolling a portion of the plate spring 108.

A front end of the plate spring 108 is slightly bent toward the frame 101a, thereby forming a lock hook 108b.

At a portion where the rotational plate 106 and the plate spring 108 are coupled to the frame 101a, the arm 106b of the rotational plate 106 is sandwiched between the frame 101a and the plate spring 108. In this manner, the lock hook 108b restricts the rotation of the rotational plate 106. In this manner, a trigger mechanism or triggering means of the lower support member is formed.

Figure 4:
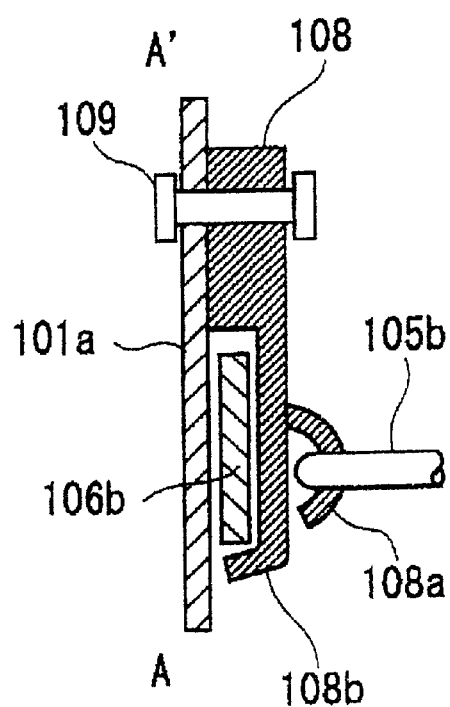
FIG. 4 is a partial cross sectional view of the seatback as seen along section line A–A' of FIG. 2, showing the locked state in accordance with the first embodiment of the present invention.
Figure 5:
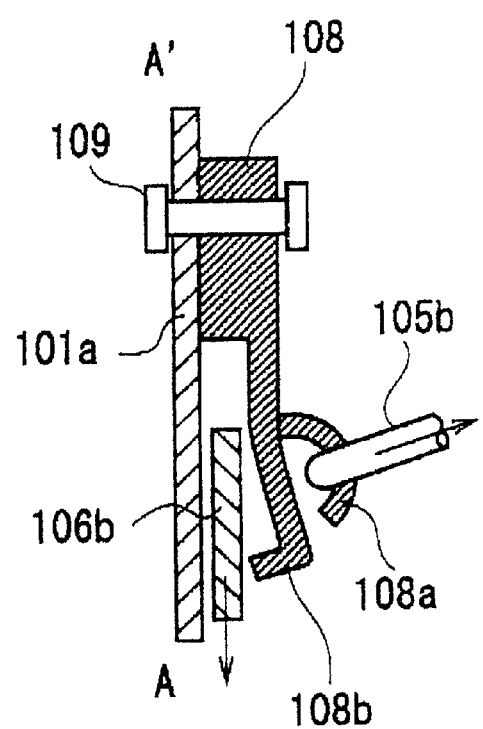
FIG. 5 is a partial cross sectional view of the seatback as seen along section line A–A' of FIG. 2, showing the lock releasing state in accordance with the first embodiment of the present invention.

FIGS. 4 and 5 show a function of the lock hook 108b in accordance with the first embodiment of the present invention. FIGS. 4 and 5 are cross sectional views as viewed from a horizontal cutting line A–A' of FIG. 2. More specifically, FIG. 4 shows a normal state, whereas FIG. 5 shows a state at the time of a vehicle collision.

In FIGS. 4 and 5, the letter A indicates the front side of the vehicle, while the letter A' indicates the rear side of the vehicle.

Referring to FIG. 4, as described above, the arm 106b of the rotational plate 106 is sandwiched between the frame 101a and the plate spring 108 in the normal state. In this state, the arm 106b of the rotational plate 106 cannot move either frontward or rearward, because the rivets 109a and 109b are attached between the plate spring 108 and the frame 101a on the rear side, and the lock hook 108b is formed on the front end of the plate spring 108 on the front side.

Referring to FIG. 5, at the time of vehicle collision, when the pelvis of the occupant is pushed against the lower S spring 105b, the portion that forms fixing hook 108a deflects in the rearward direction (right hand side in FIG. 5) inside the frames 101a and 101b due to the tension of the lower S spring 105b. Accordingly, the lock hook 108b that is formed on the front end is bent rearward. Thus, the lock of the rotational plate 106 is released.

Figure 8:
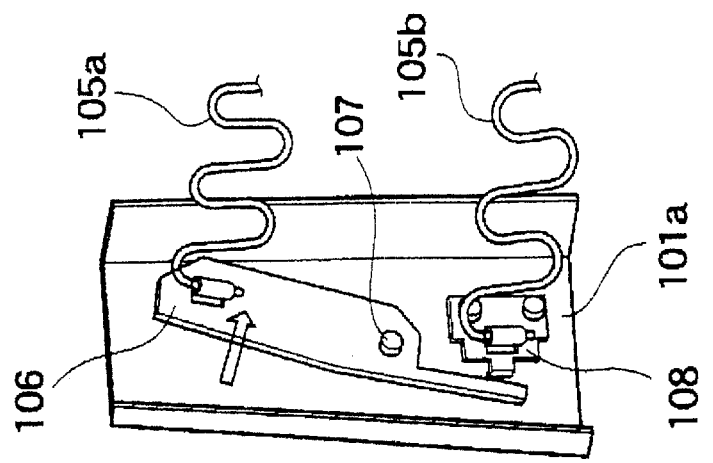
FIG. 8 is a partial perspective view of the seatback in accordance with the first embodiment of the present invention, showing further displacement of the elastic support member.
Figure 7:
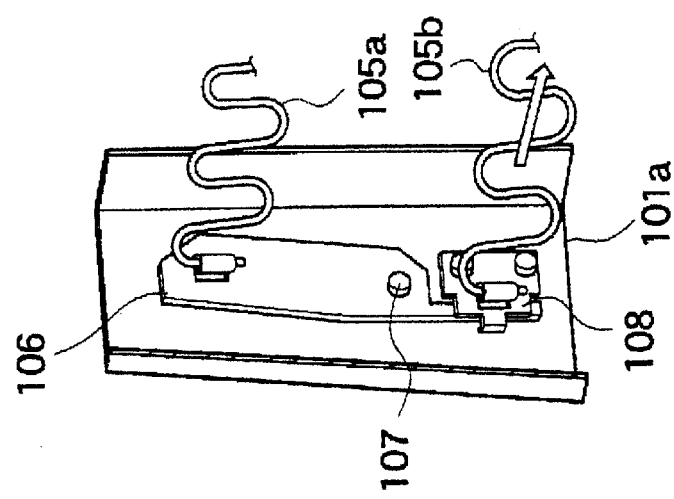
FIG. 7 is a partial perspective view of the seatback in accordance with the first embodiment of the present invention, showing a partial displacement of the elastic support member.
Figure 6:
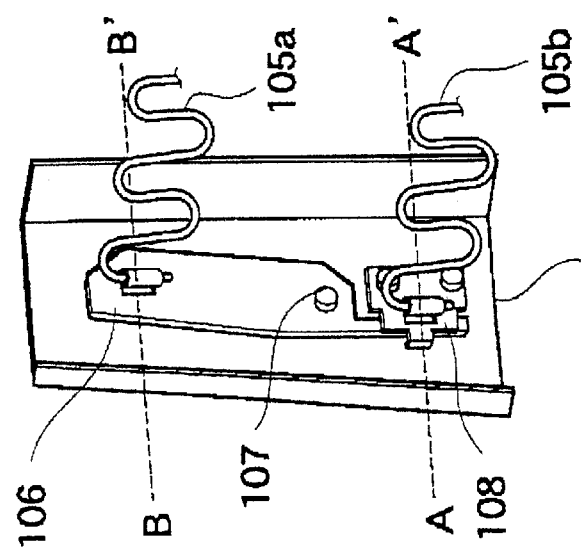
FIG. 6 is a partial perspective view of the seatback in accordance with the first embodiment of the present invention, showing the elastic support member in the unstressed state.
Figure 9:
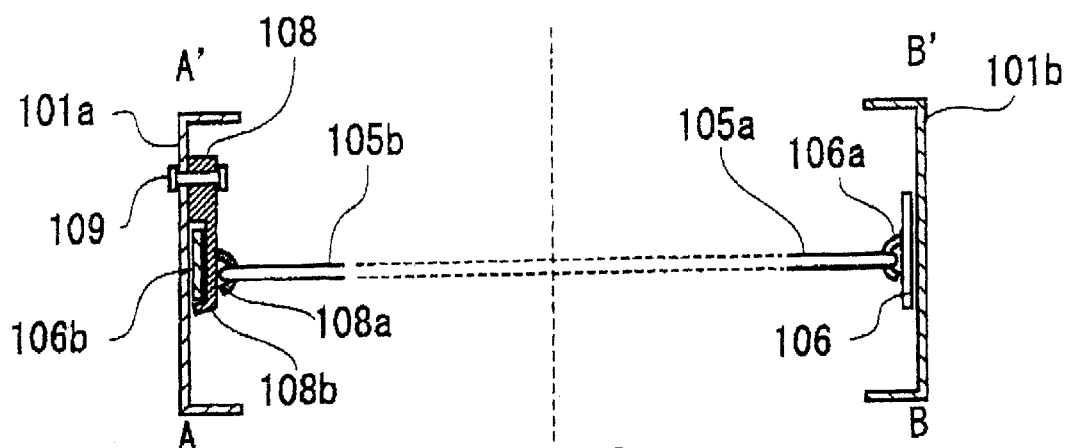
FIG. 9 is a cross sectional view of the seatback in accordance with the first embodiment of the present invention, showing the elastic support member in the unstressed state as partially seen along line A–A' of FIG. 6 and as partially seen along line B–B' of FIG. 6.
Figure 10:
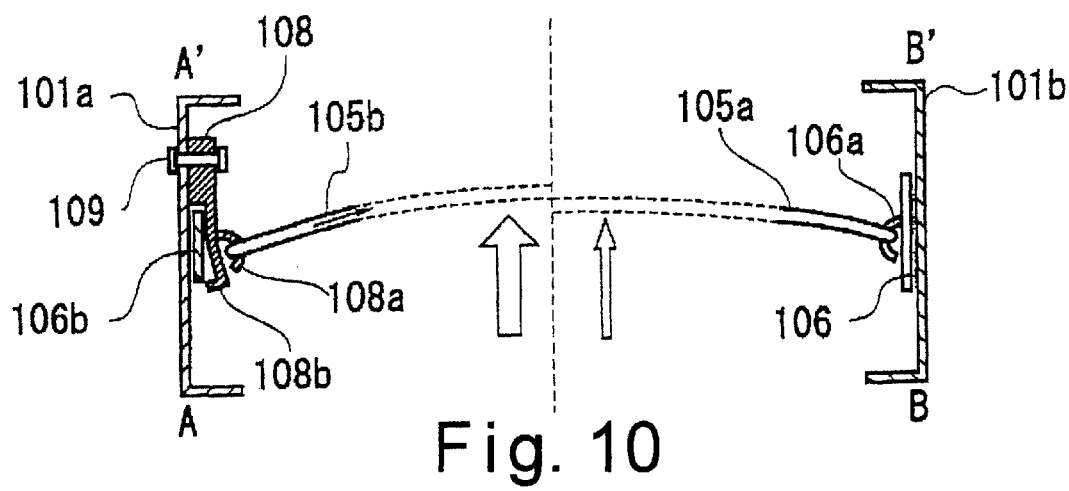
FIG. 10 is a cross sectional view of the seatback in accordance with the first embodiment of the present invention, showing a partial displacement of the elastic support member as partially seen along line A–A' of FIG. 6 and as partially seen along line B–B' of FIG. 6.
Figure 11:
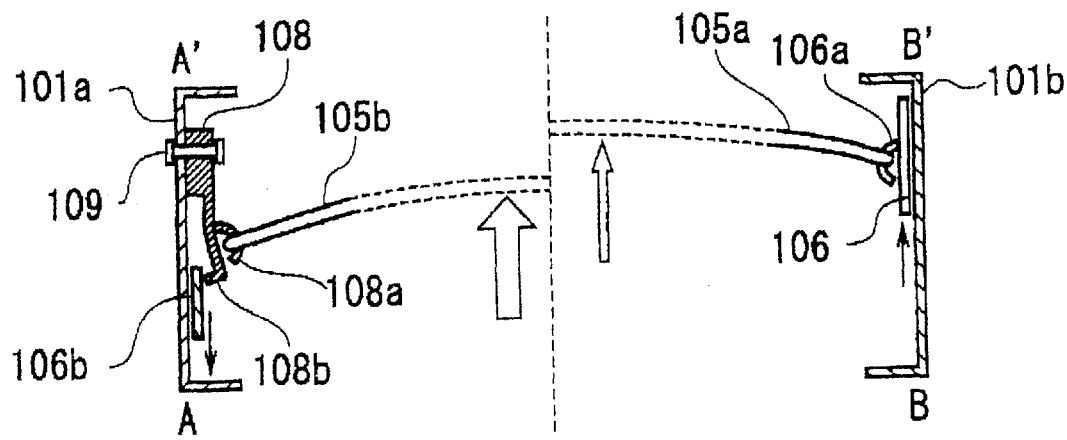
FIG. 11 is a cross sectional view of the seatback in accordance with the first embodiment of the present invention, showing further displacement of the elastic support member as partially seen along line A–A' of FIG. 6 and as partially seen along line B–B' of FIG. 6.

FIGS. 6–8 are step-by-step views of operation of the rotational plate 106 during the release of lock by the lock hook 108b. FIGS. 9–11 show movements of upper and the lower S springs 108a and 105b as seen from the section lines A–A' and B–B' of FIG. 6. The left hand sides of FIGS. 6–8 show the cross sectional views of the lower S spring 105b as seen at the height of A–A' of FIG. 6, while the right hand sides of FIGS. 6–8 show the cross sectional views of the upper S spring 105a as seen at the height of B–B' of FIG. 6.

FIGS. 6–8 and 9–11 are respectively perspective views and cross sectional views of the lock hook 108b at corresponding states. FIGS. 6 and 9 show a state during a normal operation. The rotational plate 106 is locked by the lock hook 108b of the plate spring 108. FIGS. 7 and 10 show a state in which the occupant is pushed against the seatback B by the inertia. Since the pelvis pushes the lower S spring 105b, the lower S spring 105b extends rearward. Accordingly, the lock hook 108b of the plate spring 108 releases the lock by the tension of the lower S spring 105b.

As the occupant approaches the seatback B, the upper S spring 105a is also pushed. However, since the rigidity of the upper S spring 105a is set lower than the rigidity of the lower S spring 105b, the amount of displacement of the upper S spring 105a is smaller than the amount of displacement of the lower S spring 105b as seen in FIG. 10.

However, in FIGS. 7 and 10, since the lock of the lock hook 108b of the plate spring 108 is released, the rotational plate 106 becomes freely movable. Thus, the rotational plate 106 starts moving even when a small load is applied to the upper S spring 105a. The direction of displacement of the rotational plate 106 is clockwise in FIGS. 6–8, and upward in FIGS. 9–11. FIGS. 8 and 10 show a state in which the rotational plate 106 has been moved.

Since the rotational plate 106 has a longitudinally long shape, once the rotational plate 106 rotates up to a certain angle, a portion of the rotational plate 106 contacts flanges that are disposed on front and rear sides of the frame 101a. Accordingly, the rotation of the rotational plate 106 stops.

Figure 13:
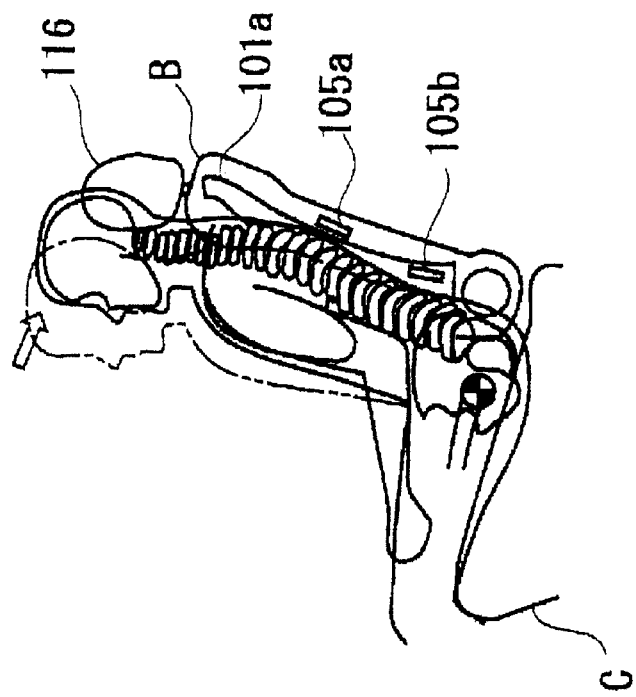
FIG. 13 is a schematic cross sectional view of the seatback in accordance with the first embodiment of the present invention, showing a second occupant protection status or position.
Figure 12:
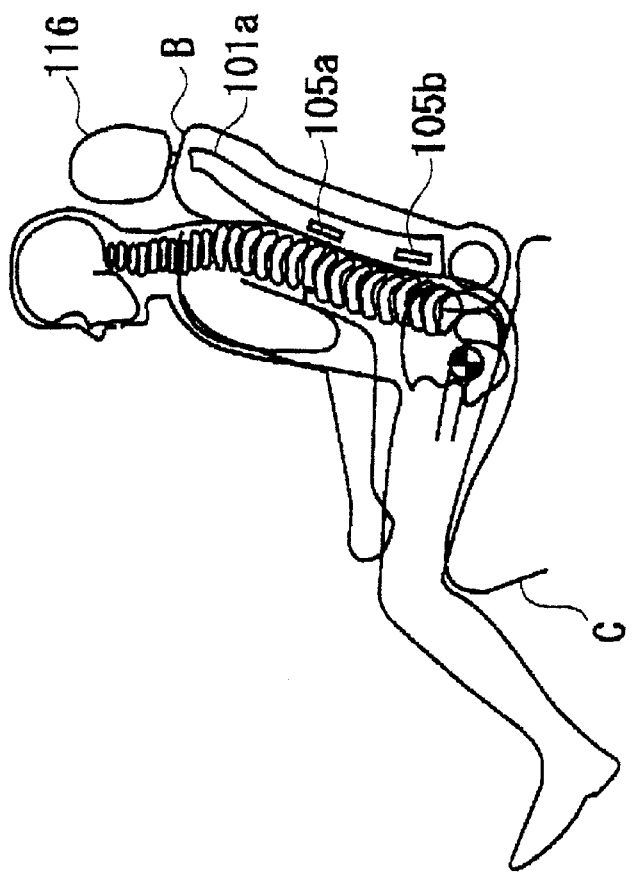
FIG. 12 is a schematic cross sectional view of the seatback in accordance with the first embodiment of the present invention, showing a first occupant protection status or position.
Figure 15:
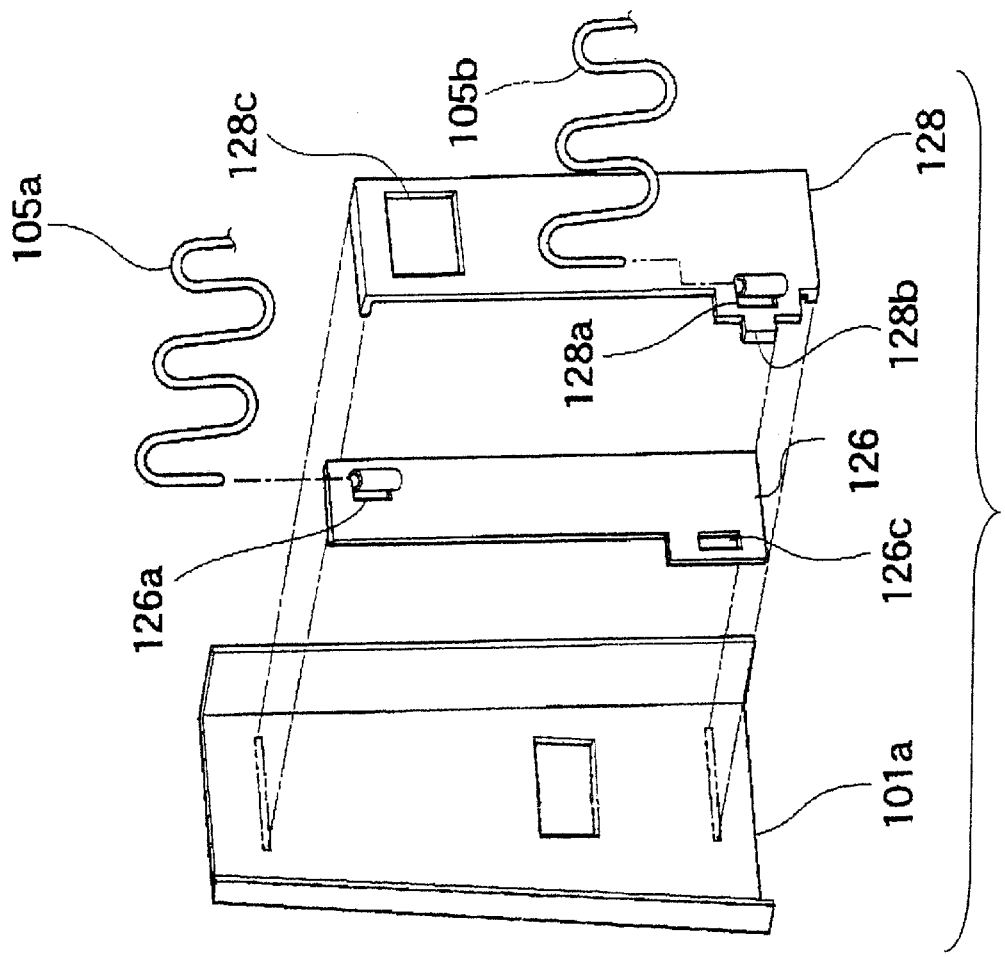
FIG. 15 is a partial perspective view of the seatback in accordance with the second embodiment of the present invention, shown in an exploded state.
Figure 14:
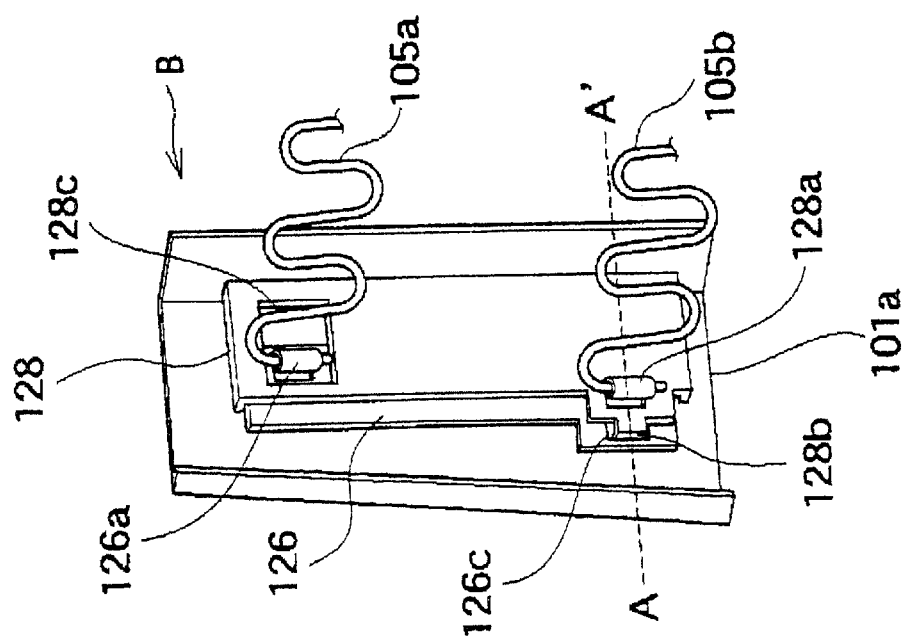
FIG. 14 is a partial perspective view of the seatback in accordance with the second embodiment of the present invention, shown in an assembled state.

FIGS. 12 and 13 show how the shape of the spine of the occupant is maintained by the rear displacement of the upper S spring 105a described above at the time of vehicle collision. FIG. 12 shows the spine shape before the collision occurs, while FIG. 13 shows the spine shape after the collision. While the occupant is in a normal sitting position, the occupant's spine has an S shape in which the area adjacent the thoracic vertebrae is bulged in the rearward direction.

At the time of collision, the seat is pushed forward along with the vehicle. On the other hand, the inertia tries to keep the occupant in the initial position. Therefore, when seen with respect to the seat, the occupant moves rearward toward the seatback B. Therefore, with a conventional seatback, the spine of the occupant tends to be straightened at the time of vehicle collision due to the contacting force between the thoracic vertebrae and the seatback.

According to the present invention, the load in the pelvis area is utilized to quickly activate a trigger mechanism that is provided with the lower S spring 105b. Therefore, while the pelvis of the occupant is stopped from moving further rearward by the lower S spring 105b, the rotational plate 106 moves in the rearward direction even by a slight load generated by the back pushing the upper S spring 105a.

More specifically, when the occupant moves rearward and the pelvis pushes the lower S spring 105b, the lock of the lock hook 108b is released. Then, the rotational plate 106 is activated to allow the upper S spring 105a to move in the rearward direction. Therefore, the upper body can sink in the seatback B. In this manner, the rearward movement of the upper S spring 105a is enabled via the displacement mechanism. Therefore, even when the chest and pelvis of the occupant move rearward by the same distance at the time of vehicle collision, the trigger mechanism can be activated by the reactionary force at the pelvis portion before the reactionary force at the thoracic vertebrae portion increases. Besides, it is particularly well known that the load in the pelvis portion increases rapidly due to the occupant's pushing the seatback at the time of vehicle collision. Accordingly, the load applied to the thoracic vertebrae of the occupant can be kept small. Also, the occupant can be supported while maintaining the shape of the spine.

In this manner, the rearwardly bulging shape of the spine can be maintained without being straightened. Furthermore, since the upper body of the occupant sinks in seatback B, the distance between the occipital portion of the occupant's head and the headrest is shortened.

Furthermore, the length between the sitting surface of the seat and the lumbar vertebrae does not vary person to person as much as the length between the sitting surface and the head does. Therefore, by providing the trigger mechanism in the lower S spring 105b as described above, the aforementioned effect of the present invention can be offered to anybody regardless of the difference in the body sizes.

Furthermore, the aforementioned series of movements of the present embodiment occurs when the upper S spring 105a is pushed rearward while the lower S spring 105b is pushed rearward with a great force. In other words, the movements occur, or the trigger mechanism and the displacement mechanism are activated, only when the occupant moves toward the seatback B horizontally, such as at the time of collision. More specifically, the rotational plate 106 is not expected to be activated during a normal operation, such as by the occupant's sitting on the pelvis and letting the back lean against the seatback B. Therefore, unwanted rearward displacement is not likely to occur during normal operations. Accordingly, the seat structure of the present invention offers better comfort.

Second Embodiment

Referring now to FIGS. 14–25, an alternate seatback is illustrated in accordance with the second embodiment of the present invention. In view of the similarity between the first and second embodiments, the parts of second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that significantly differ from the parts of the first embodiment will be indicated with new reference numbers.

In the second embodiment, two S springs 105a and 105b are utilized as the elastic support members. The upper S spring 105a is supported by a plate 126 that is slidable in a front-rear direction (hereinafter referred to as slidable plate). The lower S spring 105b is fixed to a slide frame 128. The upper S spring 105a is fixed by hooking an end portion of the upper S spring 105a to a hook 126a, which is formed by rolling up a portion of the slidable plate 126.

The slidable plate 126 has a longitudinally long shape that extends between the S springs 105a and 105b. At the height of the lower S spring 105b, a small protrusion that protrudes in a frontward direction is formed. A bore 126c is formed in the protrusion. In bore 126c, a lock hook 128b, which will be described later, engages to fix slidable plate 126.

The slidable plate 126 is stored within slidable frame 128. At a position at which the upper S spring 105a and hook 126a engage each other, a window 128c is formed in the slide frame 128. The slide frame 128 is fixed to the frame 101a by welding. The slide frame 128 is oriented so as to move in a substantially front-rear direction. In a bottom portion of the slide frame 128, a plate spring portion that is protruding by a short distance is formed. A hook 128a is formed in the protruding plate spring portion to which the lower S spring 105b is fixed.

Furthermore, a front end of the slide frame 128 is slightly bent toward the frame 101a to form a lock hook 128b.

During normal operations, the lock hook 128b engages a bore 126c formed in the slidable plate 126. In other words, in this state, the lock hook 128b restricts a rear displacement of the slidable plate 126.

Figure 16:
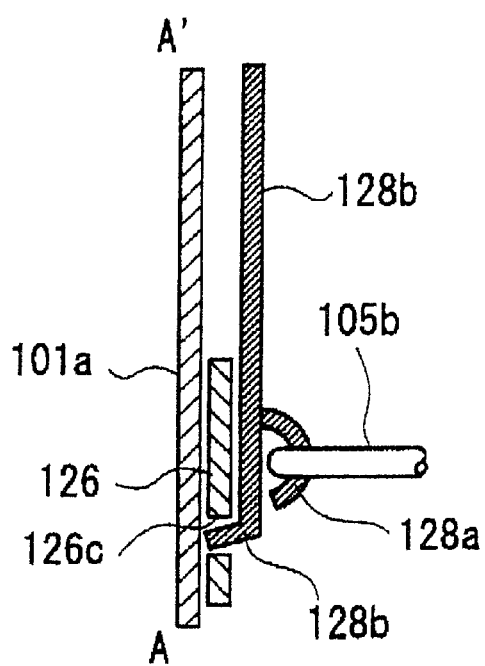
FIG. 16 a partial cross sectional view of the seatback as seen along section line A–A' of FIG. 14, showing the locked state in accordance with the second embodiment of the present invention.
Figure 17:
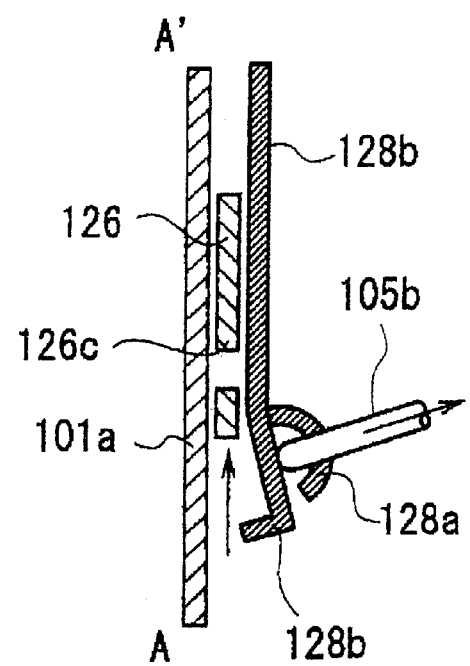
FIG. 17 is a partial cross sectional view of the seatback as seen along section line A–A' of FIG. 2, showing the lock releasing state in accordance with the second embodiment of the present invention.

FIGS. 16 and 17 show operations of slidable plate 126 during release of the lock by the lock hook 128b. FIG. 16 shows a cross sectional view during the normal operation. The lock hook 128b that is disposed at the plate spring position of the slide frame 128 engages the bore 126c of the slidable plate 126. Therefore, the movement of the slidable plate 126 is restricted. FIG. 17 shows a cross sectional view after a vehicle collision. As the pelvis of the occupant pushes against the lower S spring 105b, the lower S spring 105b extends in a diagonally rearward direction, which is the upward right direction in FIG. 17. The lock hook 128c that is at the front of the plate spring portion is released from the bore 126c of the slidable plate 126 by the tension of the lower S spring 105b. Accordingly, the lock is released. After the lock is released, slidable plate 126 moves in a rearward direction or the upward direction in FIG. 17 by the tension of the upper S spring 105a.

Figures 18, 19, 20:
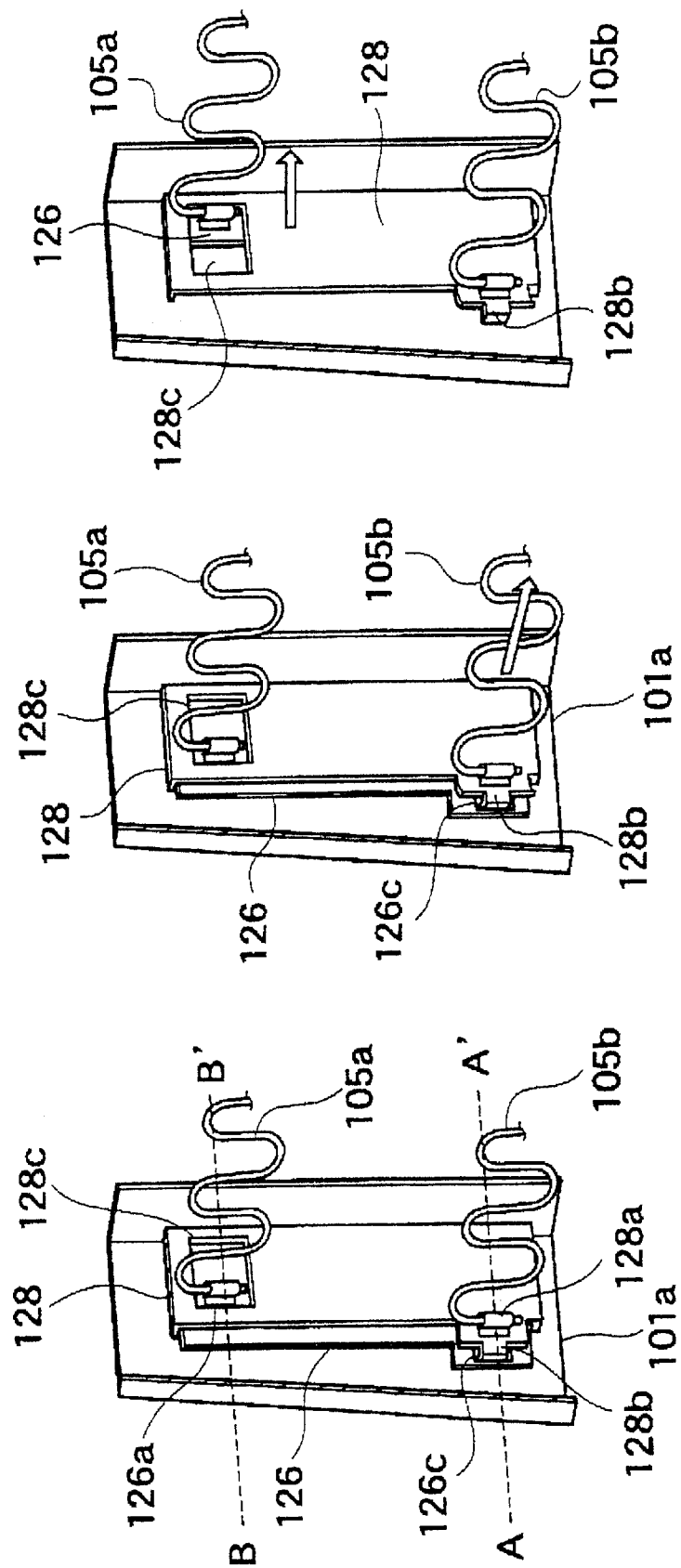
FIG. 18 is a partial perspective view of the seatback in accordance with the second embodiment, showing the elastic support member in the unstressed state.
FIG. 19 is a partial perspective view of the seatback in accordance with the second embodiment, showing a partial displacement of the elastic support member.
FIG. 20 is a partial perspective view of the seatback in accordance with the second embodiment, showing further displacement of the elastic support member.
Figure 21:
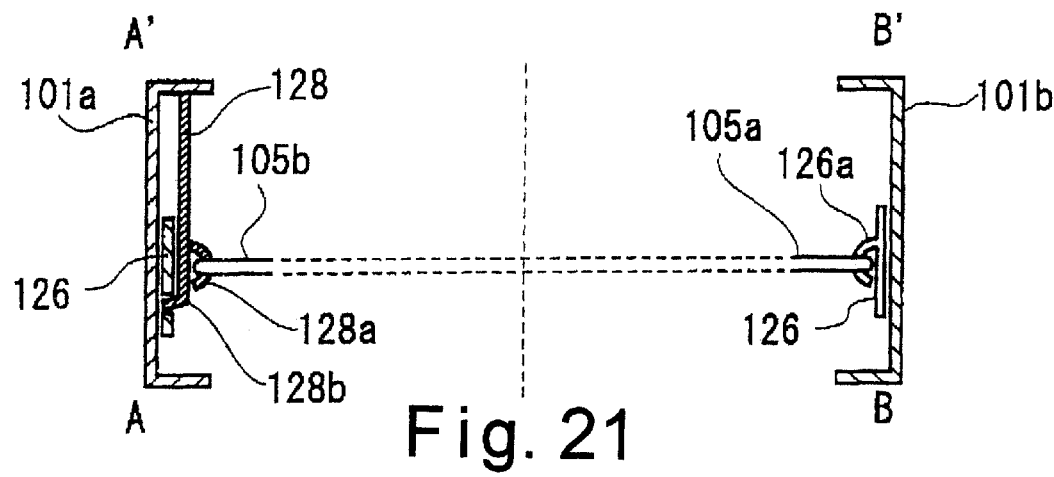
FIG. 21 is a cross sectional view of the seatback in accordance with the second embodiment of the present invention, showing the elastic support member in the unstressed state as partially seen along line A–A' of FIG. 18 and as partially seen along line B–B' of FIG. 18.
Figure 22:
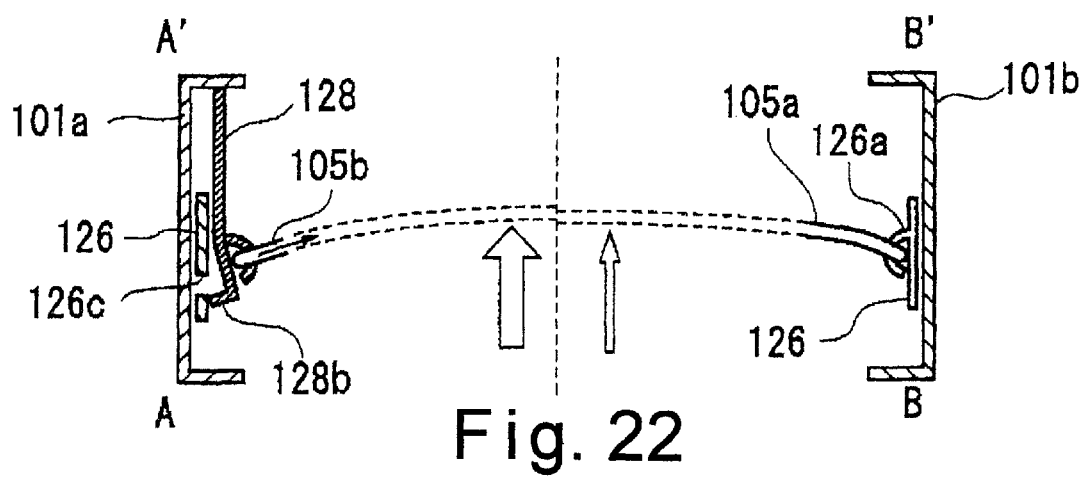
FIG. 22 a cross sectional view of the seatback in accordance with the second embodiment of the present invention, showing a partial displacement of the elastic support member as partially seen along line A–A' of FIG. 18 and as partially seen along line B–B' of FIG. 18.
Figure 23:
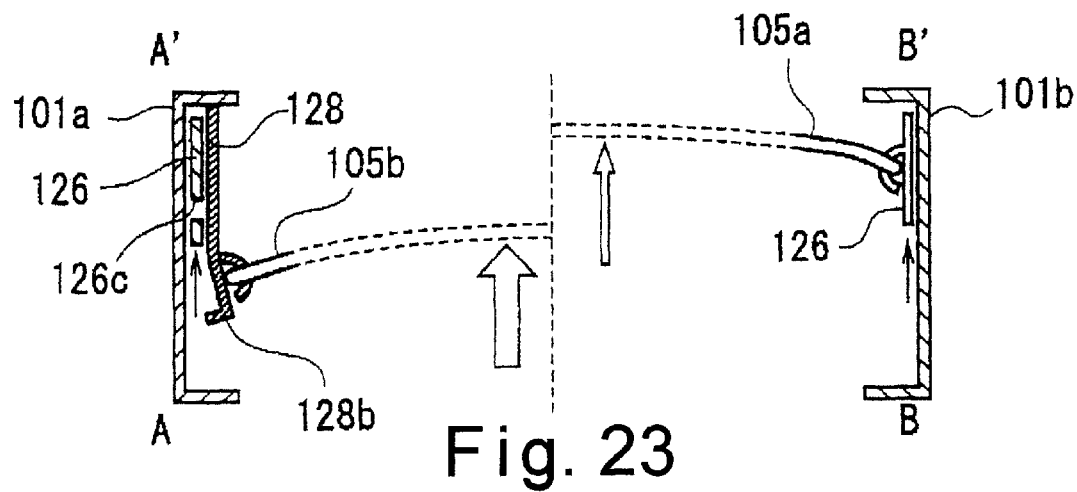
FIG. 23 is a cross sectional view of the seatback in accordance with the second embodiment of the present invention, showing further displacement of the elastic support member as partially seen along line A–A' of FIG. 18 and as partially seen along line B–B' of FIG. 18.
Figure 27:
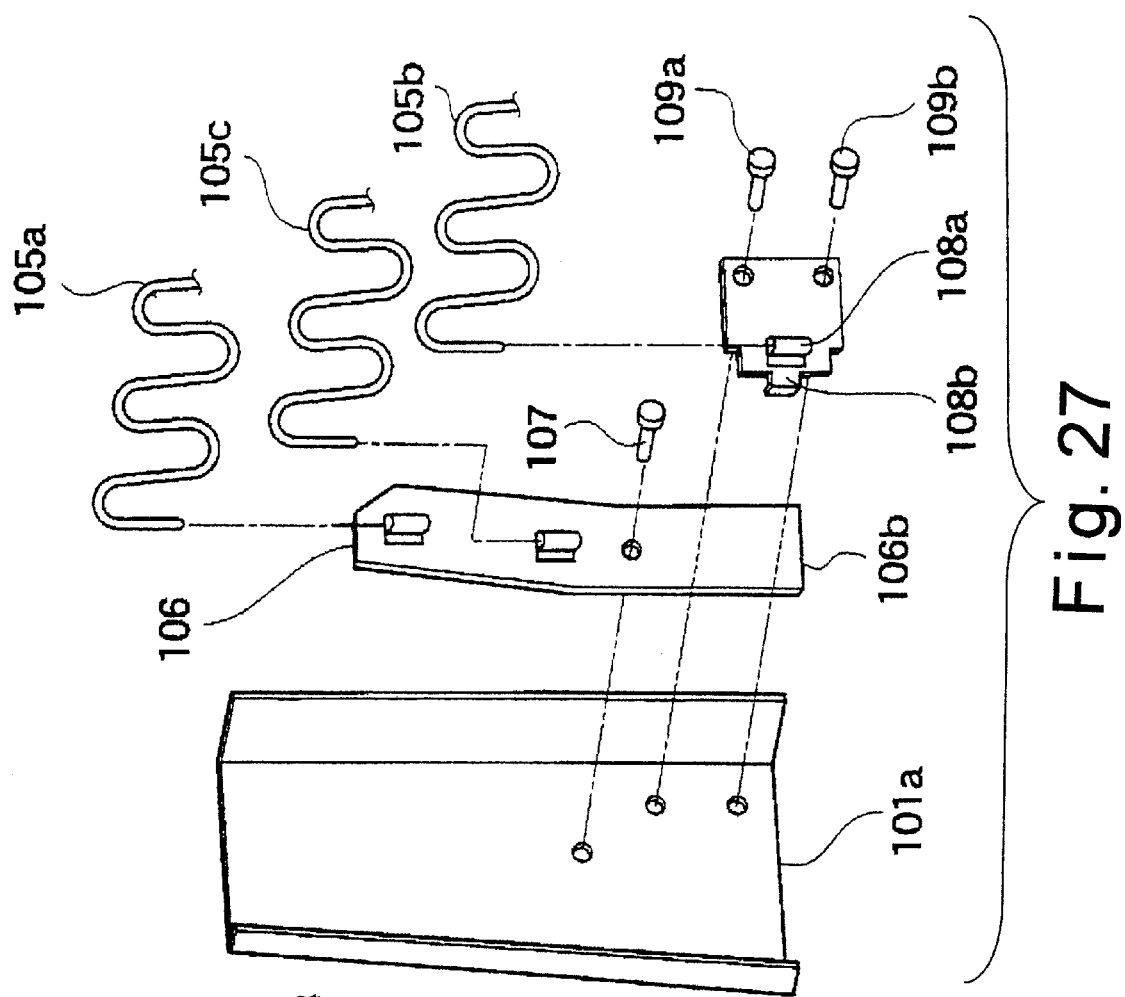
FIG. 27 is partial perspective view of a portion of a seatback structure in accordance with the third embodiment of the present invention, shown in an exploded state.
Figure 26:
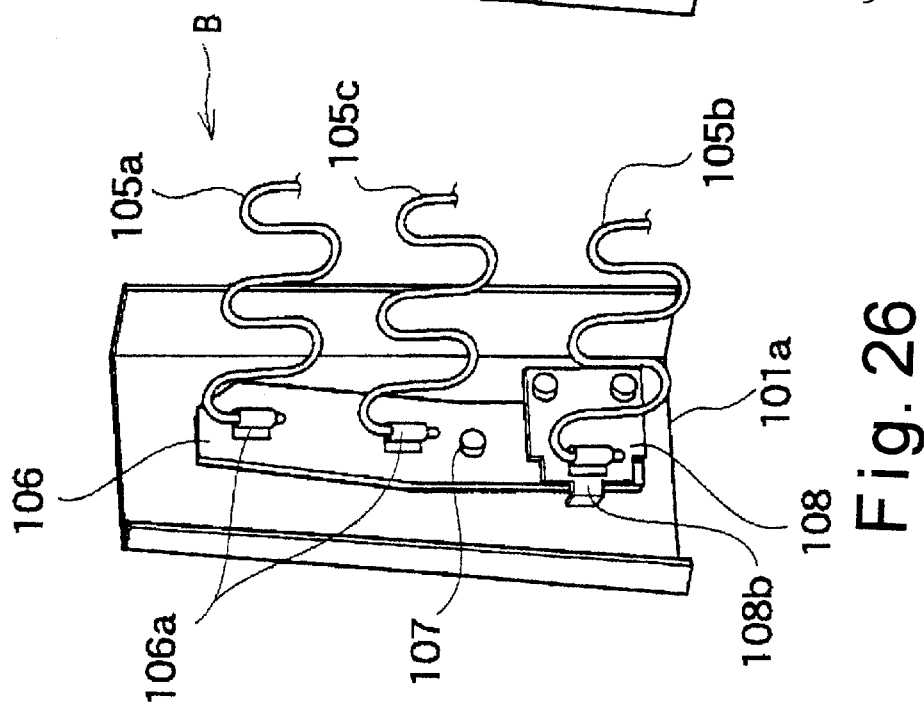
FIG. 26 is a partial perspective view of a portion of a seatback in accordance with a third embodiment of the present invention, shown in an assembled state.

FIGS. 18–20 shows step-by-step views of movements of the slidable plate 126 during the release of the lock by lock hook 128b. FIGS. 21–23 show cross sectional views as seen from the horizontal section lines A–A' and B–B' of FIG. 18, showing movements of upper and the lower S springs 105a and 105b at corresponding positions. More specifically, the left hand sides of FIGS. 21–23 show cross sectional views at the height of the line A–A', at which there is the lower S spring 105b. The right hand sides of FIGS. 21–23 show the cross sectional views at the height of the line B–B', at which there is the upper S spring 105a. FIGS. 18–20 and FIG. 21–23 are views of corresponding states.

FIGS. 18 and 21 show a normal state, in which slidable plate 126 is locked by lock hook 128b. FIGS. 19 and 22 show a state where the occupant is pushed against the seatback B by the inertia at the time of vehicle collision. Since the pelvis pushes against the lower S spring 105b, the lower S spring 105b extends in the rearward direction. The lock hook 128b that is at the plate spring portion releases the lock due to the tension of the lower S spring 105b. At this point, the slidable plate 126 becomes available for activation. Thereafter, the slidable plate 126 moves rearward even with a slight load applied to the upper S spring 105a. The sliding of the slidable plate 126 stops when the slidable plate 126 contacts the flange of the frame 101a. However, it is also possible to provide a separate stopper.

In the second embodiment, since the displacement mechanism includes the slidable plate 126, the upper S spring 105a moves in the same rearward direction as the direction of the load input. The effect of maintaining the spinal shape of the occupant at the time of vehicle collision in the second embodiment is the same as the aforementioned first embodiment.

In the second embodiment, as seen in FIG. 11, a lever 110 is provided on an opposite side of the slidable plate 126. The lever 110 passes through a bore in the frame 101a to the side surface of the seat, such that lever 110 is exposed. Therefore, after the slidable plate 126 moves rearward at the time of collision, if the occupant moves lever 110 and returns the slidable plate 126 to its original position, the occupant can resume normal operation without having to disassemble the seatback B. In other words, this forms a return mechanism, which allows the seatback B to return to its original position after activation of the displacement mechanism. Therefore, when the vehicle collision is a minor one, the return mechanism returns the displacement mechanism to its initial position. Thereafter, the occupant can continue to use the seatback. Furthermore, by adjusting the bending angle of the lock hook 128, the amount of resistance generated while the slidable plate 126 is returned to initial position to reengage the bore 126c can be adjusted.

Third Embodiment

Referring now to FIGS. 26–32, an alternate seatback B is illustrated in accordance with a third embodiment of the present invention. In view of the similarity between this embodiment and the prior embodiments, the parts of third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. The parts of the third embodiment that significantly differ from the parts of the prior embodiments will be indicated with new reference numbers.

In this embodiment, three S springs 105a, 105b and 105c are utilized as the elastic support members. The upper S spring 105a is disposed at a height that substantially corresponds to the thoracic vertebrae of the occupant. The intermediate S spring 105c and the lower S spring 105b are disposed at heights that substantially correspond to the lumbar vertebrae of the occupant. Therefore, the feel of support for the lumbar vertebrae during normal operations is improved in the third embodiment. Alternatively, three S springs can be utilized to broadly and uniformly support the lumbar vertebrae of the occupant.

The upper S spring 105a and intermediate S spring 105c are fixed to the rotational plate 106. The rotational plate 106 is rotatably coupled to the frame 101a by a pin 107. The rotational plate 106 has a longitudinally long shape. Upper and intermediate S springs 105a and 105c are disposed at fixing positions 106a that are above the position of pin 107. An arm 106b extends below pin 107. The arm 106b is shaped to have a broad width.

An end of the lower S spring 105b is fixed to a plate spring 108. The plate spring 108 is coupled to the frame 101a via a pair of rivets 109a and 109b.

Attachment point 109 formed by rivets 109a and 109b is positioned on a rear portion of the plate spring 108. A fixing point 108a of the lower S spring 105b is positioned on a front portion of the plate spring 108 relative to attachment points 109. A front end of the plate spring 108 is slightly bent toward the frame 101a, so as to form a lock hook 108b. Where the rotational plate 106 and the plate spring 108 are coupled to the frame 101a, the arm 106b of the rotational plate 106 is sandwiched between the frame 101a and the plate spring 108. In this manner, the rotation of the rotational plate 106 is restricted by the lock hook 108b.

Figure 30:
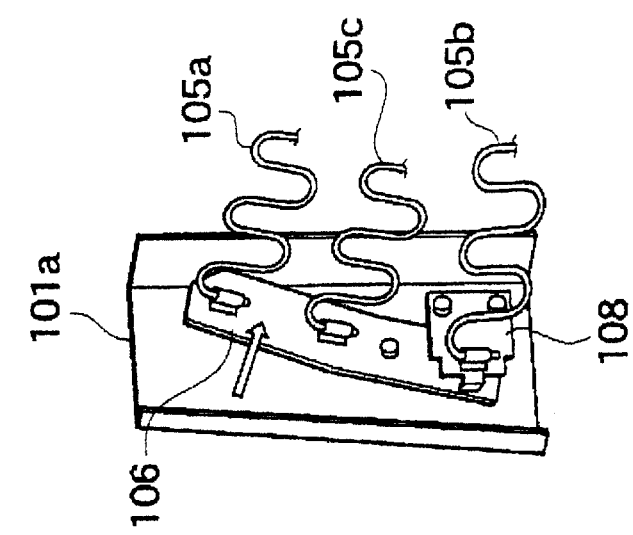
FIG. 30 is a partial perspective view of the seatback, showing further displacement of the elastic support member in accordance with the third embodiment of the present invention.
Figure 29:
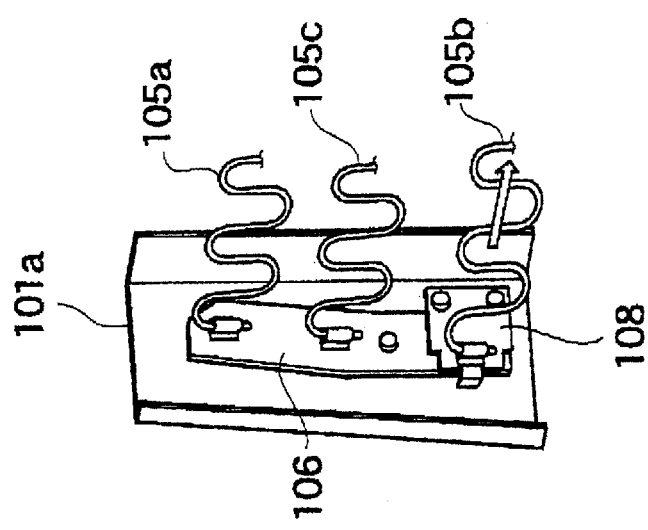
FIG. 29 is a partial perspective view of the seatback, showing a partial displacement of the elastic support member in accordance with the third embodiment of the present invention.
Figure 28:
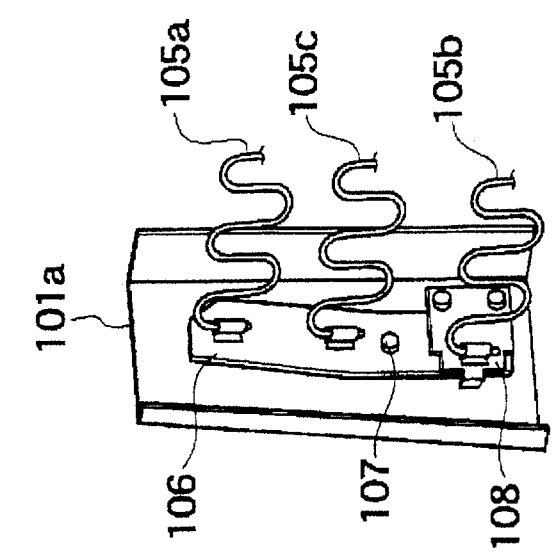
FIG. 28 is a partial perspective view of the seatback in accordance with the third embodiment of the present invention, showing the elastic support member in the unstressed state.

FIGS. 28–30 show step-by-step views of the movements of the rotational plate 106 during the release of lock by the lock hook 108b. Since the trigger mechanism of the present embodiment is activated by the elastic displacement of the lower S spring 105b, the upper S spring 105a can be moved rearward securely by synchronizing the elastic displacement of the lower S spring 105b and the activation of the trigger mechanism.

FIG. 28 shows a normal state, in which rotation of the rotational plate 106 is locked by the lock hook 108b.

FIG. 29 shows a state where the occupant is pushed against the seatback B by the inertia at the time of vehicle collision. Since the pelvis pushes the lower S spring 105b, the lower S spring 105b extends in the rearward direction. Then, the lock hook 108b of the plate spring 108 releases the lock due to the tension of the lower S spring 105b. Accordingly, the slidable plate 106 becomes available for activation. Thus, the slidable plate 106 starts moving with even a slight load applied to the upper S spring 105a and the intermediate S spring 105c.

As seen in FIG. 30, the rotational plate 106 moves in a clockwise direction. The amount of rearward movement of the upper S spring 105a, which is farther from pin 107 than intermediate S spring 105c, is greater than the amount of movement of the intermediate S spring 105c.

Figure 32:
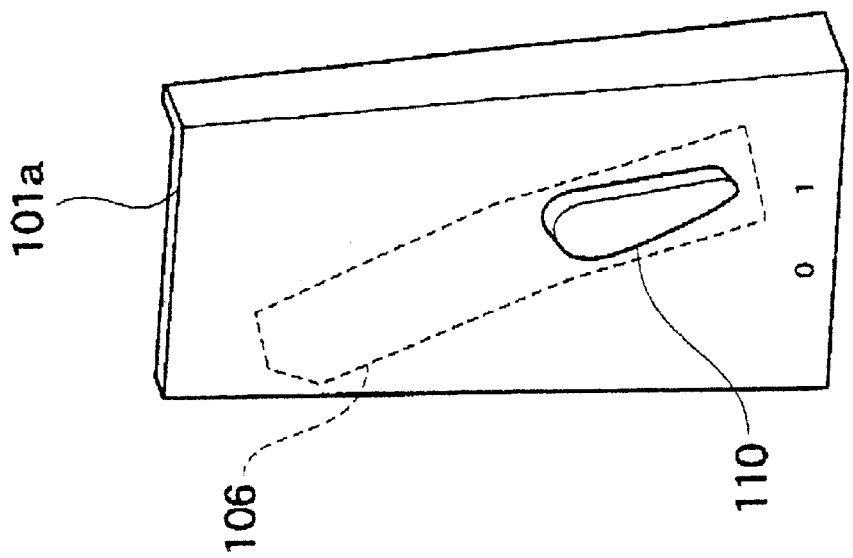
FIG. 32 is partial outside perspective view of the seatback in accordance with the third embodiment of the present invention.
Figure 31:
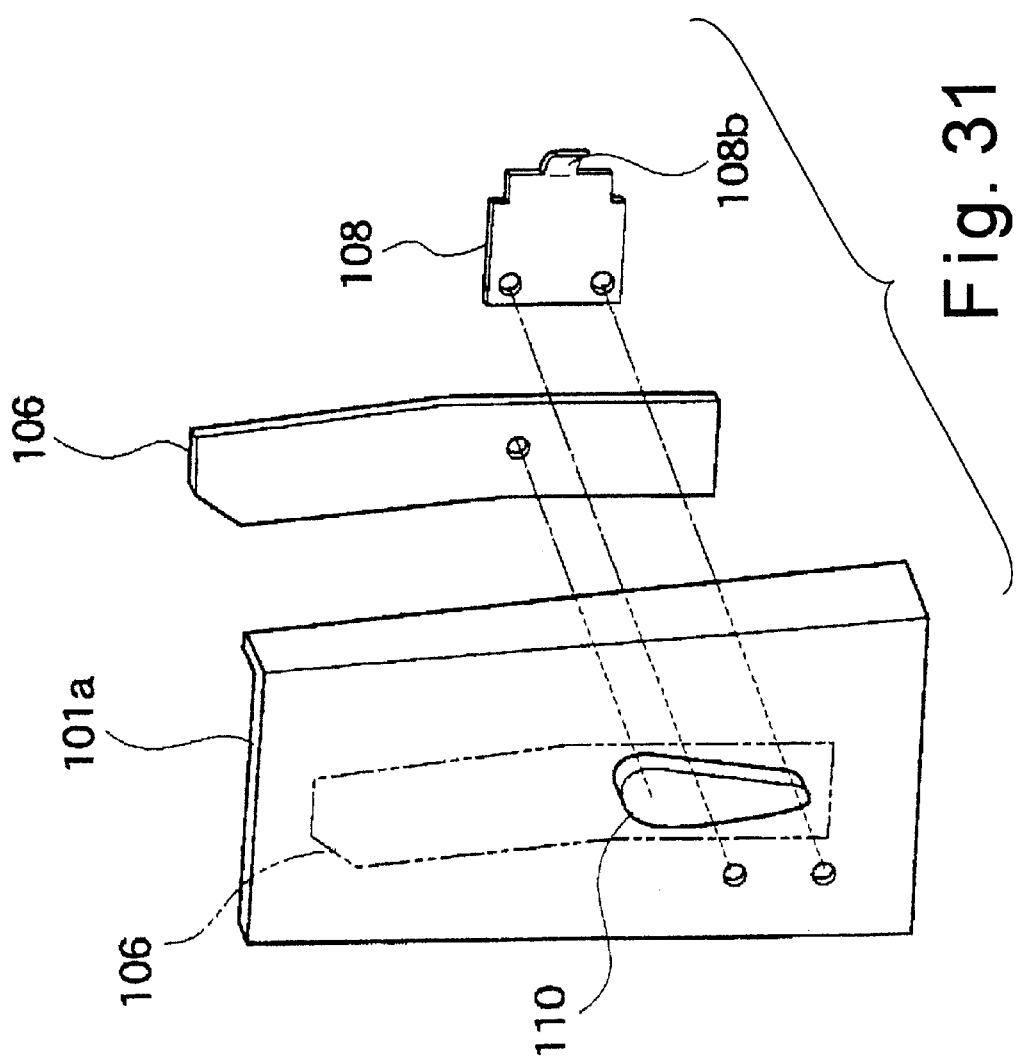
FIG. 31 is a partial outside, exploded perspective view of the seatback in accordance with the third embodiment of the present invention.
Figure 34:
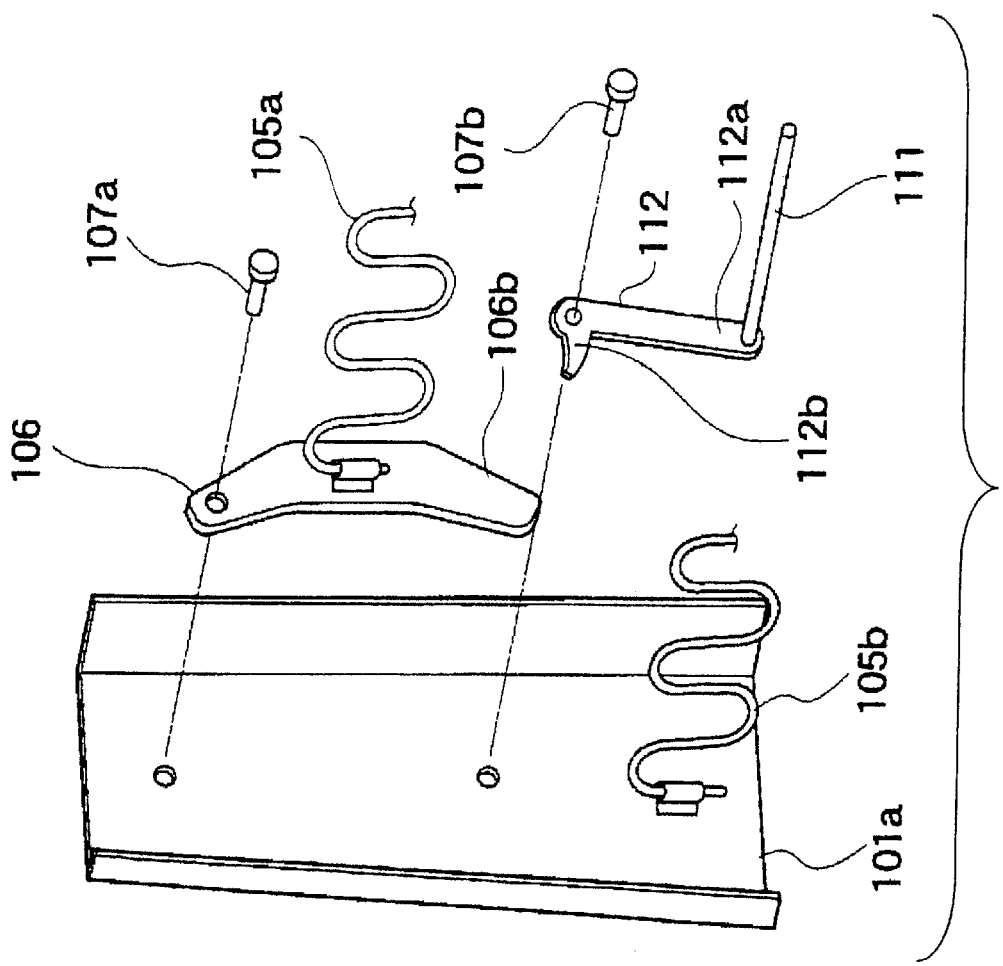
FIG. 34 is a partial perspective view of the seatback in accordance with the fourth embodiment of the present invention, shown in an assembled.
Figure 33:
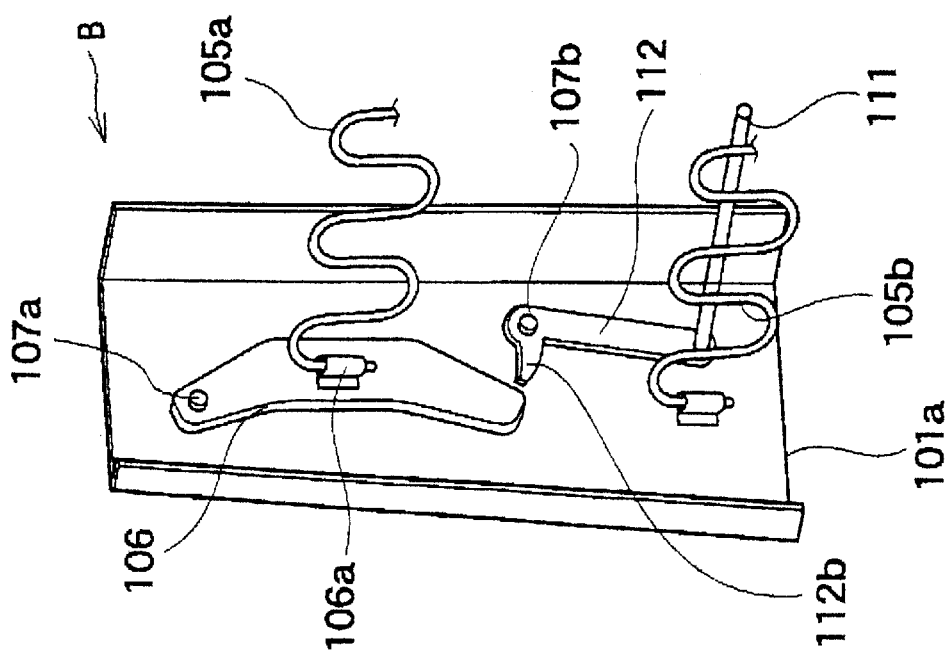
FIG. 33 is a partial perspective view of the seatback in accordance with a fourth embodiment of the present invention, shown in an assembled.

Therefore, while maintaining continuous inclination at the upper, intermediate, and lower levels, the seatback B of the third embodiment can maintain the spinal shape of the occupant. Furthermore, in this embodiment, the pin 107 of the rotational plate 106 passes through the frame 101a and is exposed to the seat surface. A lever 110 is fixedly coupled to the protruding end of the pin 107 to form a return mechanism, as seen in FIGS. 31 and 32.

Therefore, after the rotational plate 106 moves rotationally due to vehicle collision, the rotational plate 106 can be returned to its original position by moving the lever 110. In this manner, the occupant can resume the normal operation without having to disassemble the seatback B.

Furthermore, in this embodiment, the arm 106b of the rotational plate 106 has a broad width. Therefore, even after the rotational plate 106 is activated due to the collision, the lock hook 108b maintains the state shown in FIG. 30, in which the lock hook 108b is off and above the arm 106b. In this manner, the resistance while the rotational plate 106 is returned to the initial position can be reduced.

Furthermore, even for an occupant whose seated height is so short that a portion of his thoracic vertebrae is supported by the intermediate S spring 105c, the intermediate S spring 105c moves rearward at the time of vehicle collision. Therefore, the seatback B of the third embodiment prevents the spine from being straightened.

Fourth Embodiment

Referring now to FIGS. 33–37, an alternate seatback B is illustrated in accordance with a fourth embodiment of the present invention. In view of the similarity between this embodiment and the prior embodiments, the parts of fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity. The parts of the fourth embodiment that significantly differ from the parts of the prior embodiments will be indicated with new reference numbers.

In this embodiment, two S springs 105a and 105b are utilized as the elastic support members. The upper S spring 105a is fixedly coupled to the rotational plate 106. The rotational plate 106 has a longitudinally long shape. A pin 107a is provided at an upper end of the rotational plate 106, such that the rotational plate 106 rotates about pin 107a.

A fixing position 106a of the upper S spring 105a is disposed at a height that corresponds to a center area of the rotational plate 106. An arm 106b extends in a downward direction below fixing position 106a. An end of the lower S spring 105b is directly attached to the frame 101a.

A bar 111 is provided behind the lower S spring 105b. The bar 111 has a length that fits between the left and right frames. The bar 111 is fixedly coupled to an arm 112a of a rotatable link 112. The link 112 is coupled to the frame 101a via a pin 107b. A stopper hook 112b extends toward the arm 106b of the rotational plate 106.

A stopper that is not shown in the Figures restricts the forward displacement of the arm 112a of the link 112. Where the rotational plate 106 and the link 112 are attached to the frame 101a, the arm 106b of the rotational plate 106 contacts the stopper hook 112b of the link 112. Accordingly, rotation of the rotational plate 106 is restricted (locked) by the stopper hook 112b.

Figure 37:
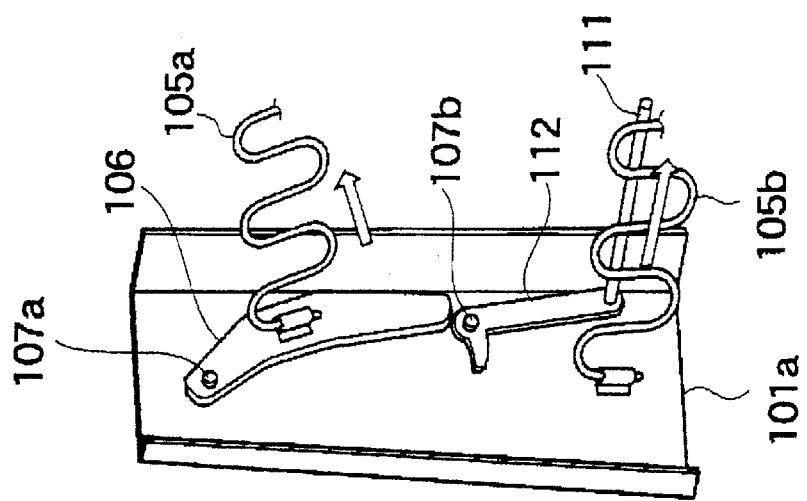
FIG. 37 is a partial perspective view of the seatback, showing further displacement of the elastic support member in accordance with the fourth embodiment of the present invention.
Figure 36:
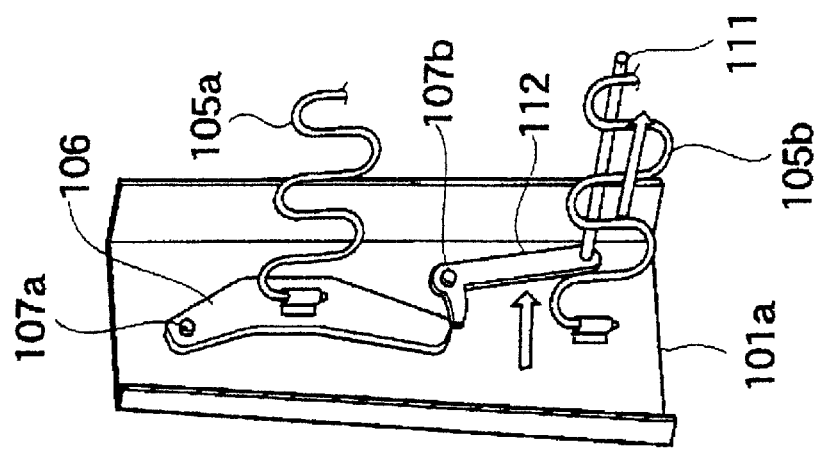
FIG. 36 is a partial perspective view of the seatback showing a partial displacement of the elastic support member in accordance with the fourth embodiment of the present invention.
Figure 35:
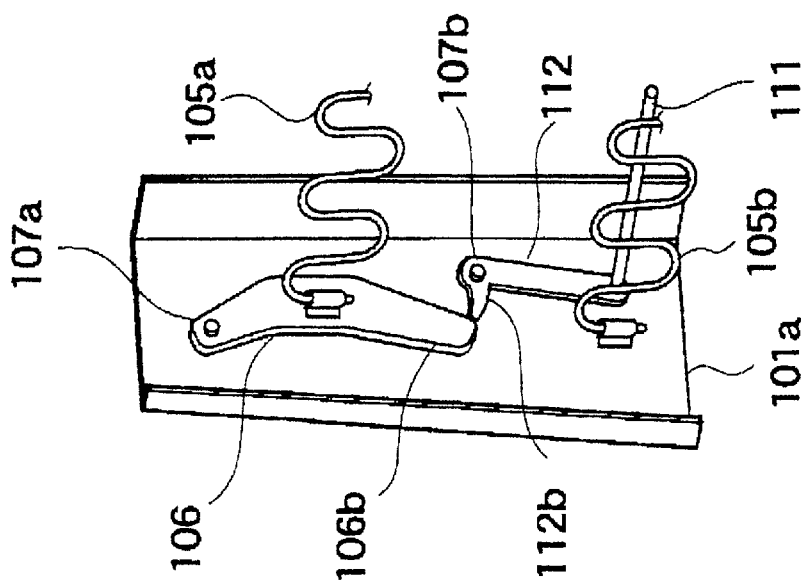
FIG. 35 is a partial perspective view of the seatback, showing the elastic support member in the unstressed state in accordance with the fourth embodiment of the present invention.
Figure 39:
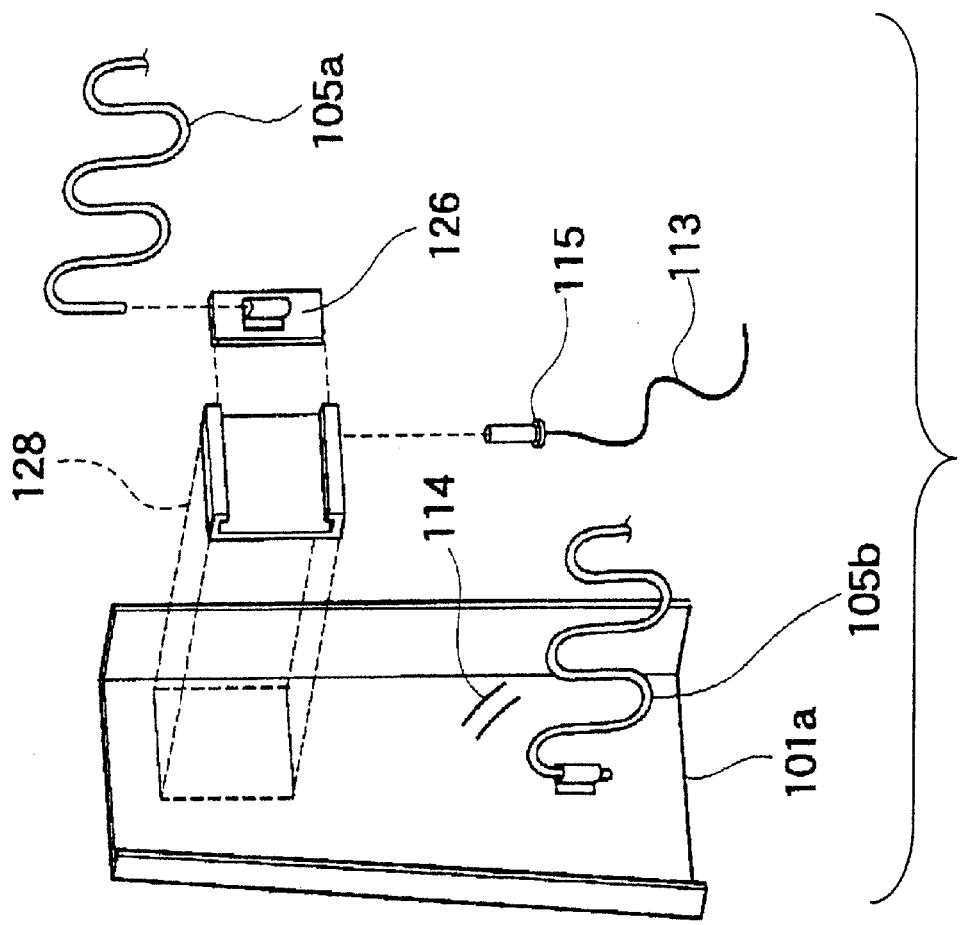
FIG. 39 is a partial perspective view of the seatback in accordance with the fifth embodiment of the present invention, shown in an exploded state.
Figure 38:
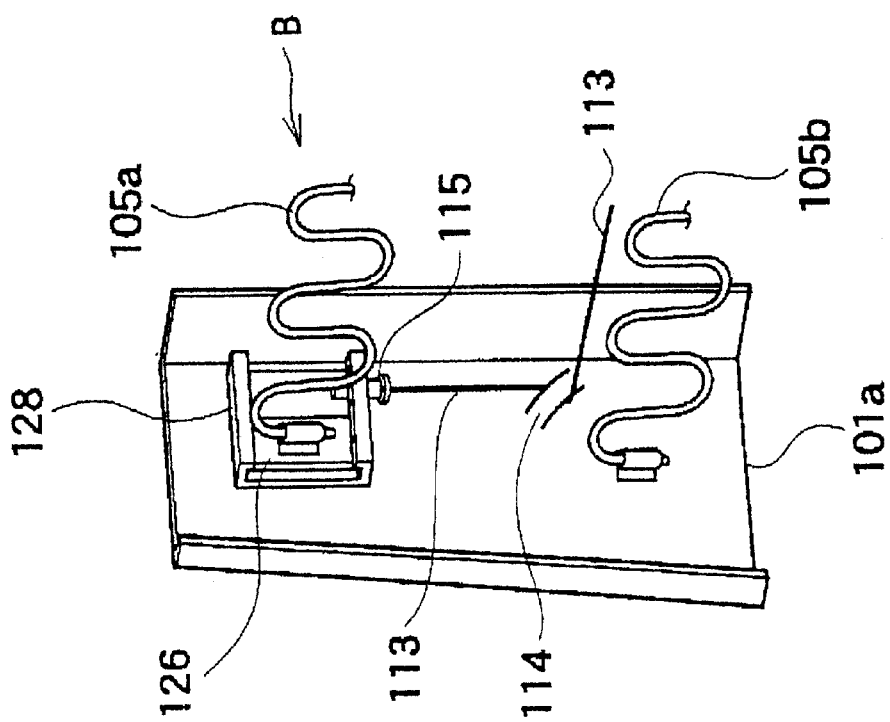
FIG. 38 is a partial perspective view of the seatback in accordance with a fifth embodiment of the present invention, shown in an assembled.

FIGS. 35–37 show step-by-step views of the movements of the rotational plate 106 during the release of lock by the stopper hook 112b. FIG. 35 shows a normal state, in which the rotational plate 106 is locked by the stopper hook 112b. FIG. 36 shows a state where the occupant is pushed against the seatback B by the inertia at the time of vehicle collision. Since the pelvis pushes the lower S spring 105b, the lower S spring 105b extends in the rearward direction. Once the lower S spring 105b moves rearward by a certain distance, a lever 111 is pushed. Accordingly, the link 112 starts rotating in a counter clockwise direction as seen in FIG. 36. In this manner, the stopper hook 112b is disengaged from the arm 106b of the rotational plate 106, and lock is released.

In this manner, the rotational plate 106 becomes available for activation. Once a load is applied to the upper S spring 105a, the rotational plate 106 starts rotating in the counter clockwise direction as seen in FIG. 37.

Therefore, the fourth embodiment can achieve the same effects as those of the first embodiment. Furthermore, a trigger mechanism or triggering means in this embodiment includes the link 112 that is rotated by the bar 111, instead of by the lower S spring 105b, in response to a rearward load. Therefore, conditions for activating the rotational plate 106 can be freely set based on the amount of displacement of the link 112. Particularly, conditions for activating the rotational plate 106 can be set without affecting the rotational plate's function of supporting the lumbar vertebrae of the occupant, which is what the rotational plate 106 is originally designed for.

Fifth Embodiment

Referring now to FIGS. 38–42, an alternate seatback B is illustrated in accordance with a fifth embodiment of the present invention. In view of the similarity between this embodiment and the prior embodiments, the parts of fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity. The parts of the fifth embodiment that significantly differ from the parts of the prior embodiments will be indicated with new reference numbers.

In this embodiment, two S springs 105a and 105b are utilized as the elastic support members. The upper S spring 105a is fixedly coupled to a slidable plate 126. The slidable plate 126 is coupled to the slide frame 128 so as to be slidable in a front-rear direction. The slide frame 128 is fixed within the frame 101a. The lower S spring 105b is directly fixed to the frame 101a. Adjacent the lower S spring 105b, a wire 113 is attached so as to fit between the left and right frames. The wire 113 passes through a through ring 114, which is formed on an inner surface of the frame 101a. The wire 113 then extends in an upward direction of the frame 101a, and is connected to a lock pin 115.

The lock pin 115 is inserted into and supported by a bore formed on a bottom surface of the slide frame 128. The lock pin 115 restricts (locks) rearward displacement of the slidable plate 126.

Figure 42:
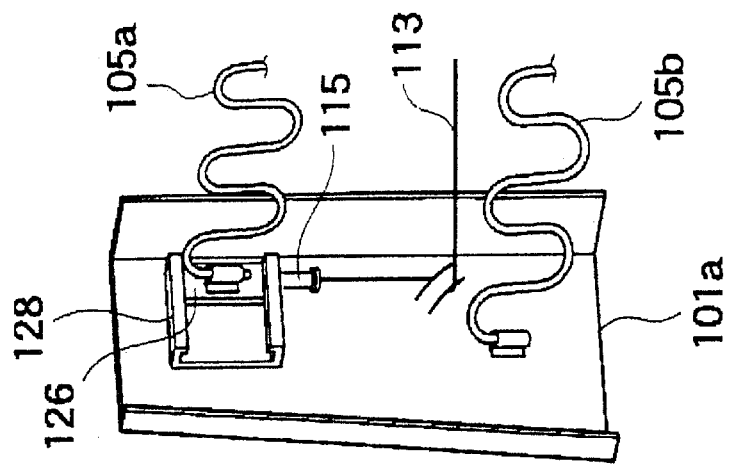
FIG. 42 is a partial perspective view of the seatback, showing further displacement of the elastic support member in accordance with the fifth embodiment of the present invention.
Figure 41:
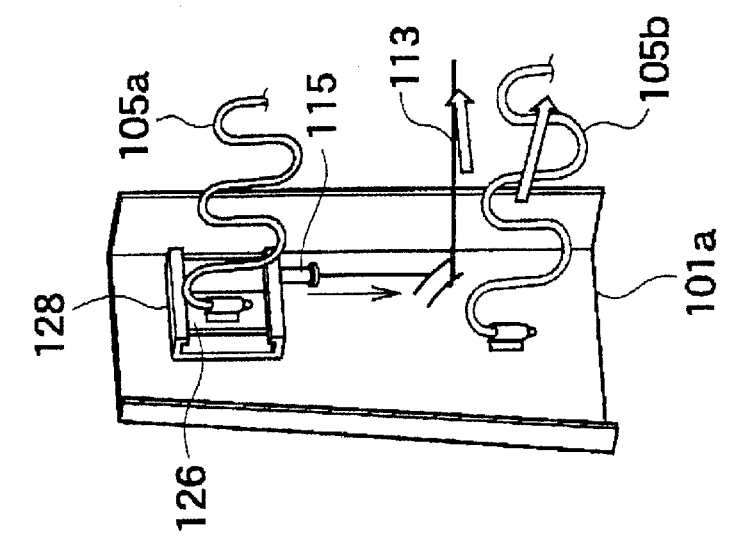
FIG. 41 is a partial perspective view of the seatback, showing a partial displacement of the elastic support member in accordance with the fifth embodiment of the present invention.
Figure 40:
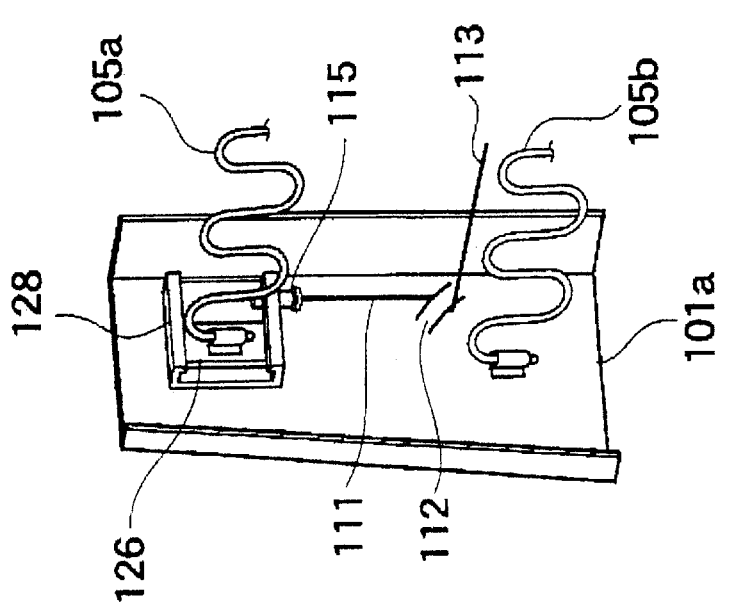
FIG. 40 is a partial perspective view of the seatback, showing the elastic support member in the unstressed state in accordance with the fifth embodiment of the present invention.

FIGS. 40–42 show step-by-step views of the movements at the time of vehicle collision in accordance with the present embodiment. FIG. 40 shows a normal state, in which the slidable plate 126 is locked by the lock pin 115. FIG. 41 shows a state where the occupant is pushed against the seatback B by the inertia at the time of vehicle collision. Since the pelvis pushes the lower S spring 105b, the lower S spring 105b extends in the rearward direction. As the lower S spring 105b moves rearward by a certain distance, the wire 113 is pushed and extended in the rearward direction. Accordingly, the lock pin 115 is pulled out in the downward direction and disengages from the slidable plate 126. In this manner, lock is released.

Thus, the slidable plate 126 becomes available for activation. Thereafter, once a load is applied to the upper S spring 105a, the slidable plate 126 moves rearward as seen in FIG. 42. Accordingly, the upper S spring 105a moves in a rearward direction.

Therefore, the fifth embodiment can achieve the same effects as those of the second embodiment. Furthermore, trigger mechanism or triggering means of the fifth embodiment includes the lock pin 115, instead of the lower S spring 105b. The lock pin 115 releases the lock based on the wire 113 that moves rearward in response to a rearward load. Therefore, conditions for activating the trigger mechanism can be set freely based on stretch characteristic of the wire 113, regardless of the elasticity of the lower S spring 105b. Particularly, the conditions for activating the trigger mechanism can be set without affecting the lower S spring's function of supporting the lumbar vertebrae of the occupant, which is what the lower S spring 105b is originally designed for.

Furthermore, when the wire 113 is utilized, there is more flexibility as to where to position the wire 113. Therefore, it is easy to prevent conflict between the wire 113 and other members that are to be stored within the seatback B.

Sixth Embodiment

Figure 43:
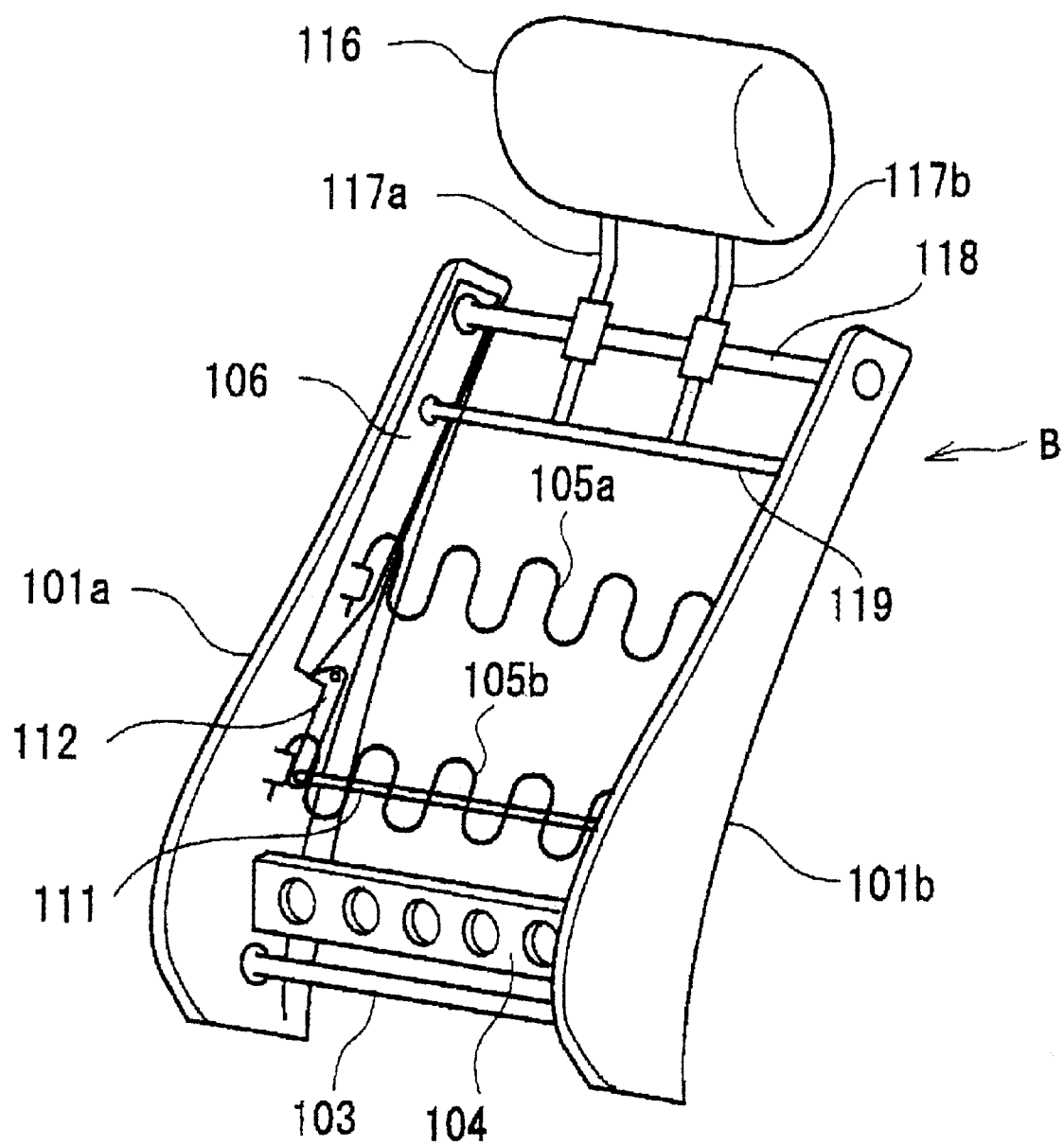
FIG. 43 is a perspective view of a frame structure of a seatback in accordance with a sixth embodiment of the present invention.
Figures 44, 45:
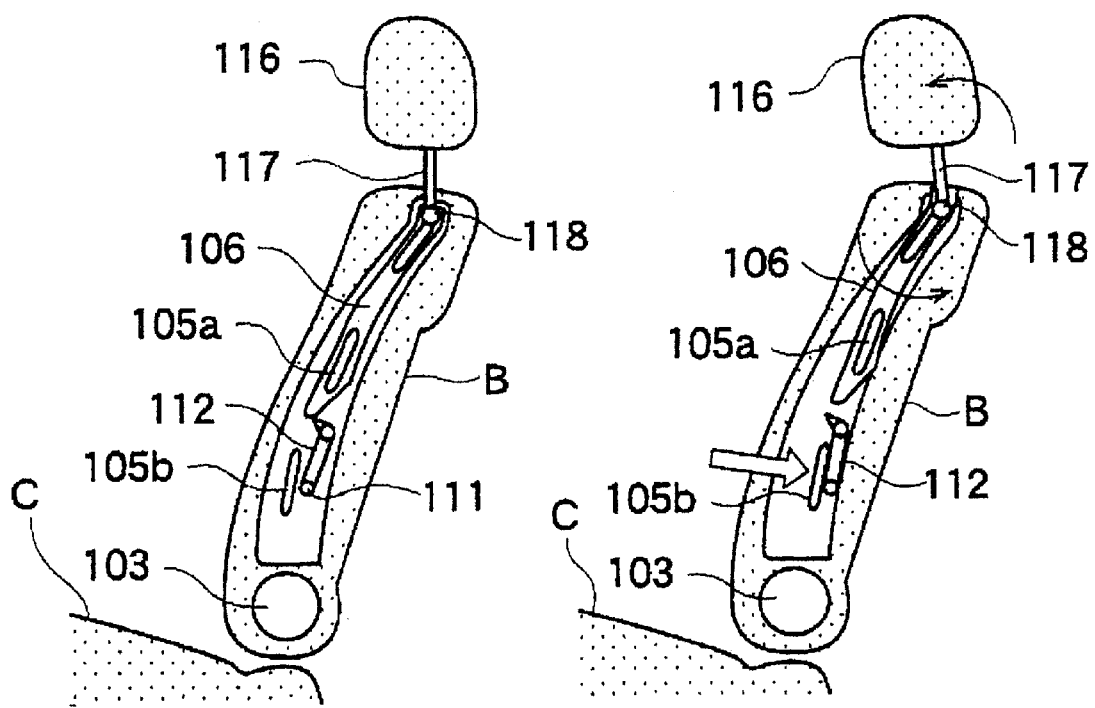
FIG. 44 is a schematic cross sectional view of the seatback in accordance with the sixth embodiment, showing a first operational status or position.
FIG. 45 is a schematic cross sectional view of the seatback in accordance with the sixth embodiment, showing the second operational status or position.

Referring now to FIGS. 43–45, a seatback B is illustrated in accordance with a sixth embodiment of the present invention. In view of the similarity between this embodiment and the prior embodiments, the parts of sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity. The parts of the sixth embodiment that significantly differ from the parts of the prior embodiments will be indicated with new reference numbers.

In this embodiment, two S springs 105a and 105b are utilized as the elastic support members. Also, the seatback B of the sixth embodiment basically has the structure of the fourth embodiment, in that the displacement mechanism or displacing means is formed by the rotational plate 106 and that the trigger mechanism or triggering means is formed by the link 112.

In this embodiment, the rod members 117a and 117b are coupled to the rotational plate 106. The rod members 117a and 117b support a headrest 116.

Instead of the upper cross 102 as in the fourth embodiment, a rotational axis 118 is fixedly coupled to the frames 101a and 101b so as to connect the left and right frames 101a and 101b. The rotational plate 106 is coupled to the rotational axis 118 so as to be rotatable about this rotational axis 118. Therefore, since the rotational plate 106 rotates about the rotational axis 118, which has small friction force, the upper S spring 105 can move rearward smoothly.

A reinforcing member 119 is fixedly coupled below the rotational axis 118 so as to connect the rotational plates 106 on both left and right sides. The headrest support members 117a and 117b are fixed to the rotational axis 118 and the reinforcing member 119.

FIGS. 44 and 45 show the movements of the seatback B in accordance with the sixth embodiment at the time of vehicle collision. In the sixth embodiment, the upper S spring 105a moves rearward due to rotation of the rotational plates 106. Also, the bottom portions of the headrest support members 117a and 117b move rearward due to the rotation of the rotational plate 106. Accordingly, the portion of the headrest 116 that is above the rotational axis 118 moves forward. Therefore, the distance between the occupant's head and the headrest can be shortened.

FIG. 44 shows a normal state, in which rotation of the rotational plate 106 is locked by the link 112. FIG. 45 shows a state where the occupant is pushed against the seatback B by the inertia at the time of vehicle collision. Since the pelvis of the occupant pushes the lower S spring 105b, the lower S spring 105b moves in the rearward direction. Accordingly, a bar 111 is also pushed.

As the bar 111 moves rearward, the link 112 releases the lock. Accordingly, the rotational plate 106 becomes available for activation.

Thereafter, as the back of the occupant pushes the upper S spring 105a, the rotational plate 106 rotates in a counter clockwise direction about rotational axis 118 as seen in FIG. 45. Accordingly, headrest 116 moves forward to protrude in the forward direction, as indicated by the circular arrows in FIG. 45. In this manner, the distance between the occipital portion of the occupant's head and headrest 116 can be shortened. Therefore, protection of the head can be ensured.

Seventh Embodiment

Figure 46:
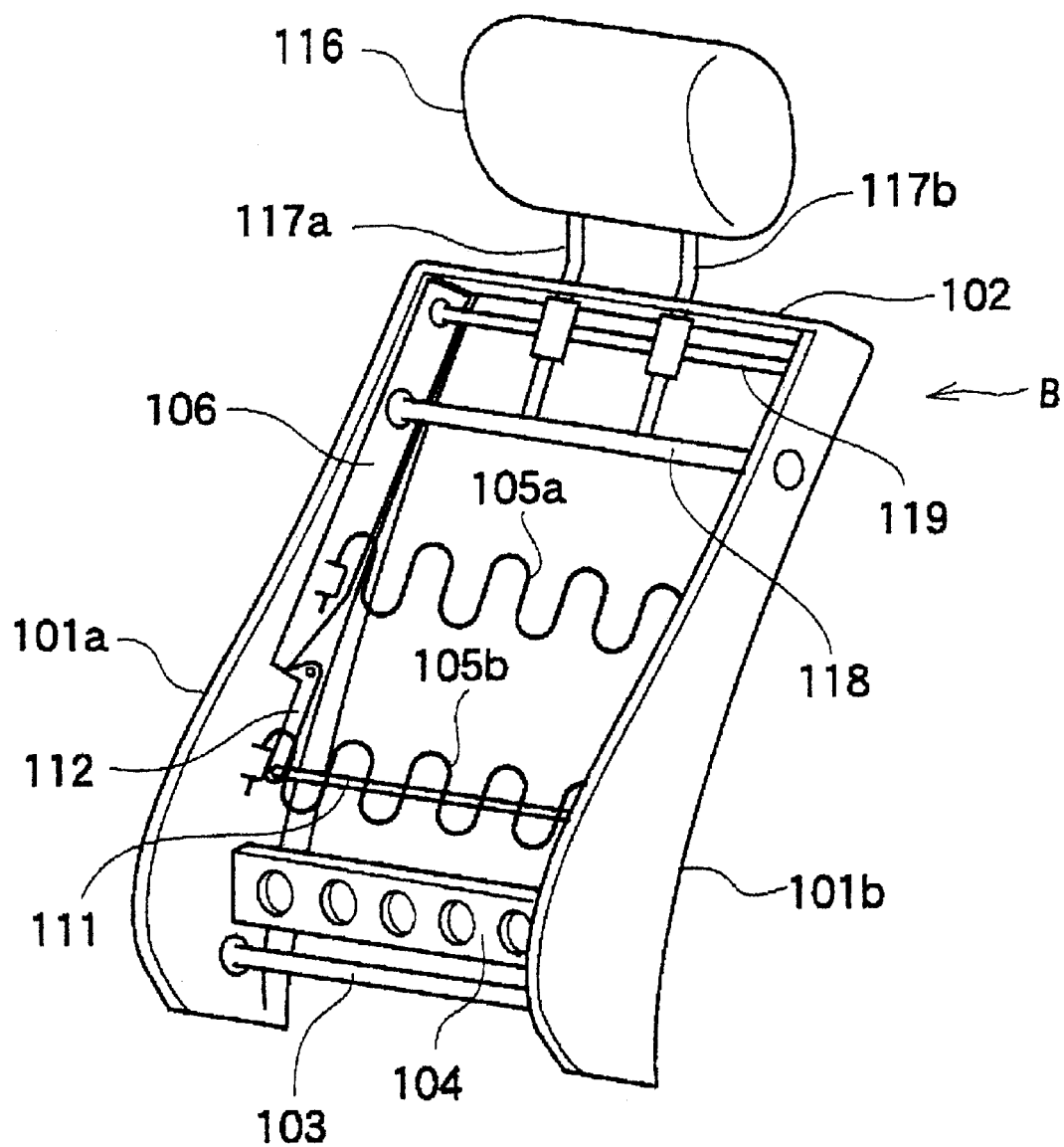
FIG. 46 is a perspective view of a frame structure of a seatback in accordance with a seventh embodiment of the present invention.

Referring now to FIG. 46, a seatback B is illustrated in accordance with a seventh embodiment of the present invention. The basic structure of the seatback of the seventh embodiment is the same as that of the sixth embodiment. In view of the similarity between this embodiment and the prior embodiments, the parts of seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity. The parts of the seventh embodiment that significantly differ from the parts of the prior embodiments will be indicated with new reference numbers.

The difference between the seventh embodiment and the sixth embodiment is that vertical positions of the rotational axis 118 and the reinforcing member 119 are switched in the seventh embodiment. As a result, the distance between the rotational axis 118 and the upper S spring 105a is shorter, whereas the distance between the rotational axis 118 and the headrest 116 is longer. Therefore, even when the amount of rearward displacement of the upper S spring 105a is small, a large forward displacement of the headrest 116 can be obtained.

Furthermore, in the seventh embodiment, since the rotational axis 118 which connects the left and right frames 101a and 101b is positioned low, a separate upper cross 102 is provided. In the upper cross 102, oval bores are formed in order to allow forward displacement of the headrest support members 117.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

This application claims priority to Japanese Patent Application No. 2000-186897. The entire disclosure of Japanese Patent Application No. 2000-186897 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A vehicle seat comprising:
a seat cushion that supports a buttock of an occupant;
a seatback having a thoracic portion and a lumber portion that support an upper body of the occupant;
at least two elastic supporting members disposed in a transverse direction within the seatback, the elastic supporting members including a lower support member disposed within the lumber portion of the seatback to support a pelvis of the occupant and an upper support member disposed within the thoracic portion of the seatback to support a back of the occupant;
a displacement mechanism disposed within the seatback and coupled between the seatback and the upper support member to move the upper support member in a rearward direction relative to the seatback; and
a trigger mechanism disposed above the seat cushion within the lumber portion of the seatback and operatively coupled to the displacement mechanism at the lower support member to activate the displacement mechanism only upon the lumber portion of the seatback being displaced rearwardly in response to a rearward load greater than a predetermined value being applied to the lumber portion of the seatback.

2. The vehicle seat as set forth in claim 1, wherein the displacement mechanism includes a slidable plate.

3. The vehicle seat as set forth in claim 1, wherein the displacement mechanism includes a rotational plate having a rotational axis.

4. A vehicle seat comprising:
a seat cushion that supports a buttock of an occupant;
a seatback that supports an upper body of the occupant;
at least two elastic supporting members disposed in a transverse direction within the seatback, the elastic supporting members including a lower support member disposed to support a pelvis of the occupant and an upper support member disposed to support a back of the occupant;
a displacement mechanism disposed within the seatback and coupled between the seatback and the upper support member to move the upper support member in a rearward direction relative to the seatback; and
a trigger mechanism disposed within the seatback and operatively coupled to the displacement mechanism at the lower support member to activate the displacement mechanism only upon receiving a rearward load greater than a predetermined value,
the displacement mechanism including a rotational plate having a rotational axis,
the seatback having a headrest coupled to the rotational plate with the rotational axis disposed between the upper support member and the headrest.

5. The vehicle seat as set forth in claim 3, wherein the seatback has a headrest with a headrest displacement mechanism that moves the headrest upon activation of the displacement mechanism by the trigger mechanism.

6. A vehicle seat comprising:
a seat cushion that supports a buttock of an occupant;
a seatback that supports an upper body of the occupant;
at least two elastic supporting members disposed in a transverse direction within the seatback, the elastic supporting members including a lower support member disposed to support a pelvis of the occupant and an upper support member disposed to support a back of the occupant;
a displacement mechanism disposed within the seatback and coupled between the seatback and the upper support member to move the upper support member in a rearward direction relative to the seatback; and
a trigger mechanism disposed within the seatback and operatively coupled to the displacement mechanism at the lower support member to activate the displacement mechanism only upon receiving a rearward load greater than a predetermined value,
the trigger mechanism including—a lock hook and a plate spring, the lock hook locking the displacement mechanism and using the plate spring to release the lock in response to a rearward elastic displacement of the lower support member.

7. A vehicle seat comprising:
a seat cushion that supports a buttock of an occupant;
a seatback that supports an upper body of the occupant;
at least two elastic supporting members disposed in a transverse direction within the seatback, the elastic supporting members including a lower support member disposed to support a pelvis of the occupant and an upper support member disposed to support a back of the occupant;
a displacement mechanism disposed within the seatback and coupled between the seatback and the upper support member to move the upper support member in a rearward direction relative to the seatback; and
a trigger mechanism disposed within the seatback and operatively coupled to the displacement mechanism at the lower support member to activate the displacement mechanism only upon receiving a rearward load greater than a predetermined value,
the trigger mechanism including—a link having a stopper hook that locks the displacement mechanism, the stopper hook releasing the lock when a rearward load near the lower support member rotates the stopper hook.

8. The vehicle seat as set forth in claims 1, wherein the trigger mechanism includes a lock pin that locks the displacement mechanism and releases the lock by tension of a wire when the rearward load applied to the lumber portion of the seatback pulls the wire.

9. The vehicle seat as set forth in claim 2, wherein the trigger mechanism includes a lock pin that locks the displacement mechanism and releases the lock by tension of a wire when the rearward load applied to the lumber portion of the seatback pulls the wire.

10. A vehicle seat comprising:

a seat cushion that supports a buttock of an occupant;

a seatback that supports an upper body of the occupant;

at least two elastic supporting members disposed in a transverse direction within the seatback, the elastic supporting members including a lower support member disposed to support a pelvis of the occupant and an upper support member disposed to support a back of the occupant;

a displacement mechanism disposed within the seatback and coupled between the seatback and the upper support member to move the upper support member in a rearward direction relative to the seatback; and a trigger mechanism disposed within the seatback and operatively coupled to the displacement mechanism at the lower support member to activate the displacement mechanism only upon receiving a rearward load greater than a predetermined value, the lower support member having a first rigidity and the upper support member has a second rigidity that is lower than the first rigidity of the lower support member.

11. The vehicle seat as set forth in claim 1, further comprising an intermediate support member disposed in the transverse direction between the upper support member and the lower support member, the intermediate support member having an end supported by the seatback via the displacement mechanism.

12. The vehicle seat as set forth in claim 1, further comprising a return mechanism arranged to allow the displacement mechanism to return to an original position after the displacement mechanism is activated.

13. A vehicle seat comprising:

a seat cushion that supports a buttock of an occupant;

a seatback having a thoracic portion and a lumber portion that support an upper body of the occupant;

elastic supporting means, disposed within the seatback, for supporting the thoracic portion and a lumber portion of the seatback;

displacing means, disposed within the seatback, for moving the thoracic portion of the seatback relative to the lumber portion of the seatback in a rearward direction relative to the seat cushion; and triggering means, disposed above the seat cushion within the lumber portion of the seatback, for activating the displacing means only upon the lumber portion of the seatback being displaced rearwardly in response to a rearward load greater than a predetermined value being applied to the lumber portion of the seatback.

14. The vehicle seat as set forth in claim 13, further comprising return means, coupled to the displacing means, for returning the displacing means to an original position after the displacing means is activated.

15. The vehicle seat as set forth in claim 13, wherein the seatback has a headrest with headrest displacing means for moving the headrest upon activation of the displacing means by the trigger means.

16. The vehicle seat as set forth in claim 1, wherein the trigger mechanism is operatively coupled between the lower support member and the displacement mechanism such that the lower support member activates the trigger mechanism to release the displacement mechanism, when the rearward load applied to the lumber portion of the seatback causes rearward elastic displacement of the lower support member rearward relative to the seat cushion by a predetermined amount.

17. The vehicle seat as set forth in claim 1, wherein the trigger mechanism includes a release element that is arranged to release the displacement mechanism when the rearward load applied to the lumber portion of the seatback moves the release element rearward relative to the seat cushion by a predetermined amount.

18. A vehicle seat comprising:

a seat cushion that supports a buttock of an occupant;

a seatback having a thoracic portion and a lumber portion that support an upper body of the occupant;

at least two elastic supporting members disposed in a transverse direction within the seatback, the elastic supporting members including a lower elastic support member disposed in the lumber portion of the seatback to support a pelvis of the occupant and an upper elastic support member disposed in the thoracic portion of the seatback to support a back of the occupant;

a displacement mechanism disposed within the seatback and coupled between the seatback and the upper elastic support member to move the upper elastic support member in a rearward direction relative to the seatback independently of the lower elastic support member; and a trigger mechanism disposed within the seatback and operatively coupled to the displacement mechanism at the lower elastic support member to activate the displacement mechanism only upon receiving a rearward load greater than a predetermined value.

* * * * *